(12) United States Patent
Mueller et al.

(10) Patent No.: US 9,776,155 B1
(45) Date of Patent: *Oct. 3, 2017

(54) HYDROCARBON VAPOR RECOVERY SYSTEM WITH OXYGEN REDUCTION

(71) Applicant: EcoVapor Recovery Systems, LLC, Denver, CO (US)

(72) Inventors: Hans Peter Mueller, Denver, CO (US); David Scott Gorham, Denver, CO (US); Nicholas Taylor Koerner, Denver, CO (US)

(73) Assignee: EcoVapor Recovery Systems, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/678,336

(22) Filed: Apr. 3, 2015

Related U.S. Application Data

(63) Continuation of application No. 14/286,983, filed on May 23, 2014, and a continuation-in-part of
(Continued)

(51) Int. Cl.
*B01J 19/00* (2006.01)
*B01J 19/24* (2006.01)
(Continued)

(52) U.S. Cl.
CPC .......... *B01J 8/0285* (2013.01); *B01J 8/0496* (2013.01); *B01J 2208/00017* (2013.01); *B01J 2208/00548* (2013.01); *B01J 2208/027* (2013.01)

(58) Field of Classification Search
CPC .. B01J 19/00; B01J 19/24; B01D 3/00; B01D 3/40; B01D 3/34; C10G 7/00; C10G 7/08;
(Continued)

(56) References Cited

U.S. PATENT DOCUMENTS 1,653,387 A    12/1927   Brown
2,126,367 A    8/1938   Clawson et al.
(Continued)

FOREIGN PATENT DOCUMENTS

JP    08034497    2/1996
JP    08034497 A   *   2/1996
(Continued)

OTHER PUBLICATIONS

Trotter, Gary L. & Rhodes, Zane Q., "Catalytic Oxygen Removal for the Aberdeen Coal Mine Methane Project in Carbon County, Utah", downloaded on Jun. 29, 2015, pp. 1-9, available at www.newpointgas.com/blog/wp-content/uploads/2009/11/zanes-2008-gpa-paper-website.pdf.
(Continued)

*Primary Examiner* — Natasha Young
(74) *Attorney, Agent, or Firm* — Red Rocks Law, LLC

(57) ABSTRACT

A system for reducing dioxygen ($O_2$) present in vapors from oil storage tanks. The system may include an inlet that receives vapors from the tanks; a heating device coupled with the inlet that heats vapors to a first temperature to form heated vapor; and a vessel coupled receiving heated vapor and containing at least one catalyst to reduce dioxygen from the heated vapor. The catalyst may include palladium, and the vessel may include zinc oxide to remove sulfur from the heated vapor. A compressor may be used to compress the vapors. A controller may be provided to monitor $O_2$ concentration in heated vapor, and the controller directs flow of heated vapor to a gas pipeline if the $O_2$ concentration is below a predetermined level; or if the $O_2$ concentration is unacceptably high, the controller directs flow of vapor to be re-circulated within the system to further reduce $O_2$ concentration therein.

20 Claims, 20 Drawing Sheets

Related U.S. Application Data application No. 13/365,247, filed on Feb. 2, 2012, now Pat. No. 8,992,838.

(60) Provisional application No. 61/826,543, filed on May 23, 2013, provisional application No. 61/918,583, filed on Dec. 19, 2013.

(51) Int. Cl.

| | | |
|---|---|---|
| *B01D 3/00* | (2006.01) | |
| *B01D 3/34* | (2006.01) | |
| *B01D 3/40* | (2006.01) | |
| *C10G 7/00* | (2006.01) | |
| *C10G 7/08* | (2006.01) | |
| *C10G 7/12* | (2006.01) | |
| *E21B 43/00* | (2006.01) | |
| *E21B 43/34* | (2006.01) | |
| *E21B 43/40* | (2006.01) | |
| *B01J 8/02* | (2006.01) | |
| *B01J 8/04* | (2006.01) | |
| *F25J 5/00* | (2006.01) | |

(58) Field of Classification Search
CPC . C10G 7/12; E21B 43/00; E21B 43/34; E21B 43/40; F25J 5/00
See application file for complete search history.

(56) References Cited

U.S. PATENT DOCUMENTS

| | | | |
|---|---|---|---|
| 2,947,379 A | 8/1960 | Aubrey | |
| 3,331,194 A | 7/1967 | Reed et al. | |
| 3,707,157 A | 12/1972 | Tipton et al. | |
| 4,273,189 A | 6/1981 | Carpenter | |
| 4,422,301 A | 12/1983 | Watt et al. | |
| 4,579,565 A | 4/1986 | Heath | |
| 4,747,853 A | 5/1988 | Haslett et al. | |
| 5,132,011 A | 7/1992 | Ferris | |
| 5,135,360 A | 8/1992 | Anderson et al. | |
| 5,139,390 A | 8/1992 | Rajewski | |
| 5,149,344 A | 9/1992 | Macy | |
| 5,195,587 A | 3/1993 | Webb | |
| 5,249,593 A | 10/1993 | Higgins et al. | |
| 5,524,456 A | 6/1996 | Stokes | |
| 5,651,389 A | 7/1997 | Anderson | |
| 5,775,442 A | 7/1998 | Speed | |
| 5,900,137 A | 5/1999 | Homan | |
| 5,970,957 A | 10/1999 | Fried et al. | |
| 5,979,481 A | 11/1999 | Ayresman | |
| 6,209,651 B1 | 4/2001 | Knight | |
| 6,363,959 B1 | 4/2002 | Ollivier | |
| 6,422,313 B1 | 7/2002 | Knight | |
| 6,527,002 B1 | 3/2003 | Szakaly | |
| 6,681,789 B1 | 1/2004 | Moulis et al. | |
| 6,881,329 B2 | 4/2005 | Amado et al. | |
| 6,955,704 B1 | 10/2005 | Strahan | |
| 7,069,942 B2 | 7/2006 | Trefall et al. | |
| 7,350,581 B2 | 4/2008 | Wynn | |
| 7,504,037 B2 | 3/2009 | Gibbs | |
| 7,645,433 B2 | 1/2010 | Rhodes et al. | |
| 7,661,436 B2 * | 2/2010 | Singh | E21B 41/005 137/251.1 |
| 7,691,344 B2 | 4/2010 | Yoshimura | |
| 7,695,702 B2 | 4/2010 | Rhodes et al. | |
| 7,735,670 B2 * | 6/2010 | Zaki | B01D 19/0073 220/88.3 |
| 7,749,308 B2 | 7/2010 | McCully | |
| 7,766,031 B2 | 8/2010 | Platusich et al. | |
| 8,133,300 B1 | 3/2012 | Gonsalves, III et al. | |
| 8,206,124 B1 | 6/2012 | Varani et al. | |
| 8,475,966 B2 | 7/2013 | Knight et al. | |
| 8,529,215 B2 | 9/2013 | Heath et al. | |
| 8,708,663 B1 | 4/2014 | Varani et al. | |
| 8,992,838 B1 * | 3/2015 | Mueller | 422/129 |
| 2003/0183394 A1 | 10/2003 | Reitz | |
| 2005/0051503 A1 | 3/2005 | Holland et al. | |
| 2006/0144080 A1 | 7/2006 | Heath et al. | |
| 2007/0284240 A1 | 12/2007 | Rhodes et al. | |
| 2008/0202593 A1 | 8/2008 | Allard et al. | |
| 2010/0154727 A1 | 6/2010 | Malgorn et al. | |
| 2010/0158717 A1 | 6/2010 | Vogt | |
| 2010/0263758 A1 | 10/2010 | Young | |
| 2011/0186305 A1 | 8/2011 | Wilde | |
| 2012/0079851 A1 * | 4/2012 | Heath et al. | 62/617 |

FOREIGN PATENT DOCUMENTS

| | | |
|---|---|---|
| WO | 2005045173 A2 | 5/2005 |
| WO | WO 2005/045173 A2 * | 5/2005 |

OTHER PUBLICATIONS

Newpoint Gas, LP, "Oxygen Removal from Natural Gas: Newpoint Gas O2 Removal Services", downloaded on Jun. 29, 2015, pp. 1-2, available at www.newpointgas.com/naturalgas_oxygen.php.
Portable Vapor Bladders, R.A. Nichols Engineering (www.raneng.com), downloaded Nov. 7, 2014, 2 pages.
Rane Ring Vapor Holder Systems, R.A. Nichols Engineering (www.raneng.com), downloaded Nov. 7, 2014, 2 pages.
Terminal Vapor Recovery Sizing Data, R.A. Nichols Engineering (www.raneng.corn), downloaded Nov. 7, 2014, 1 page.
Truck Transportable Portable Vapor Bladder, R.A. Nichols Engineering (www.raneng.com), downloaded Nov. 7, 2014, 3 pages.
Vapor Holders, R.A. Nichols Engineering (www.raneng.com), downloaded Nov. 7, 2014, 2 pages.

* cited by examiner

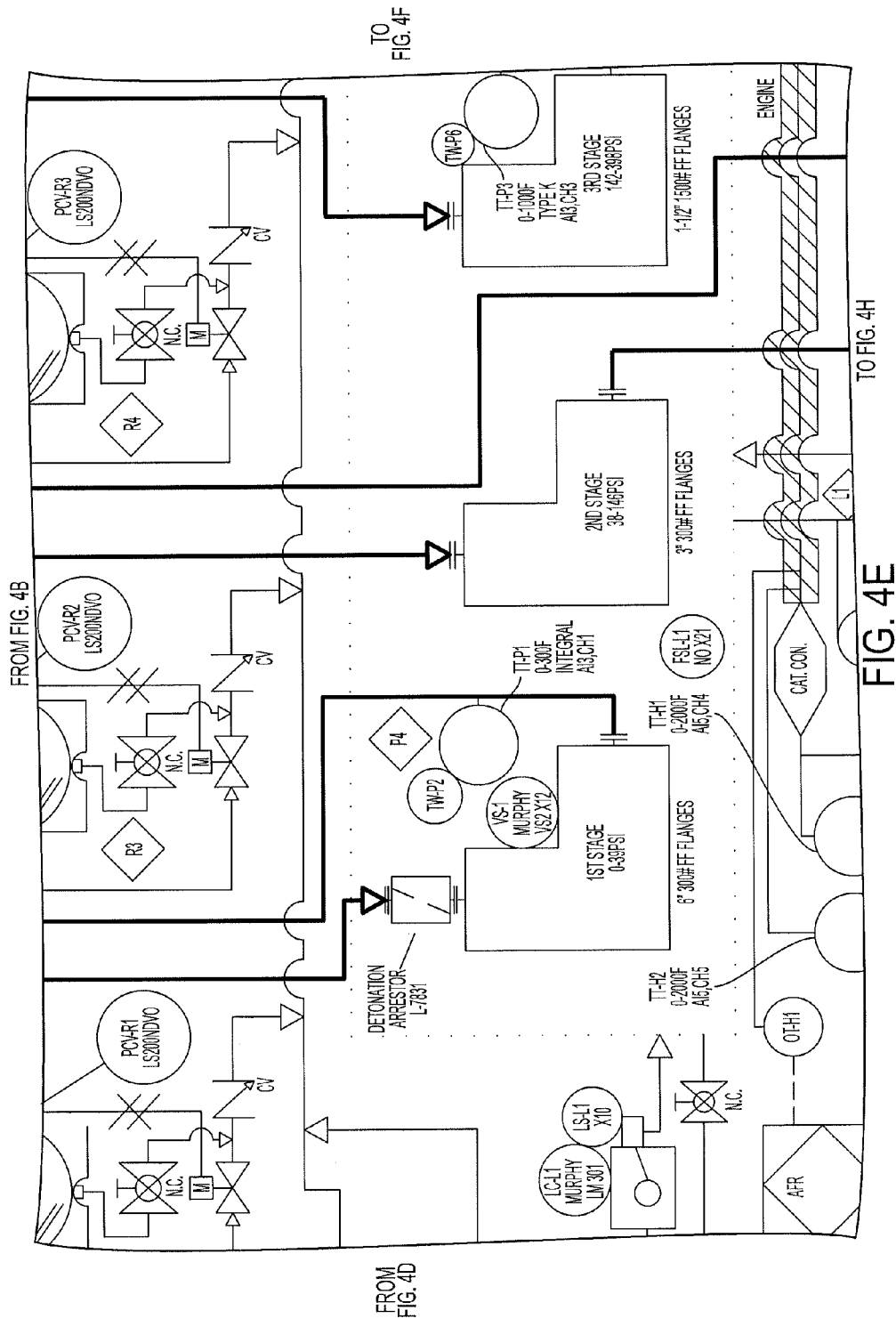

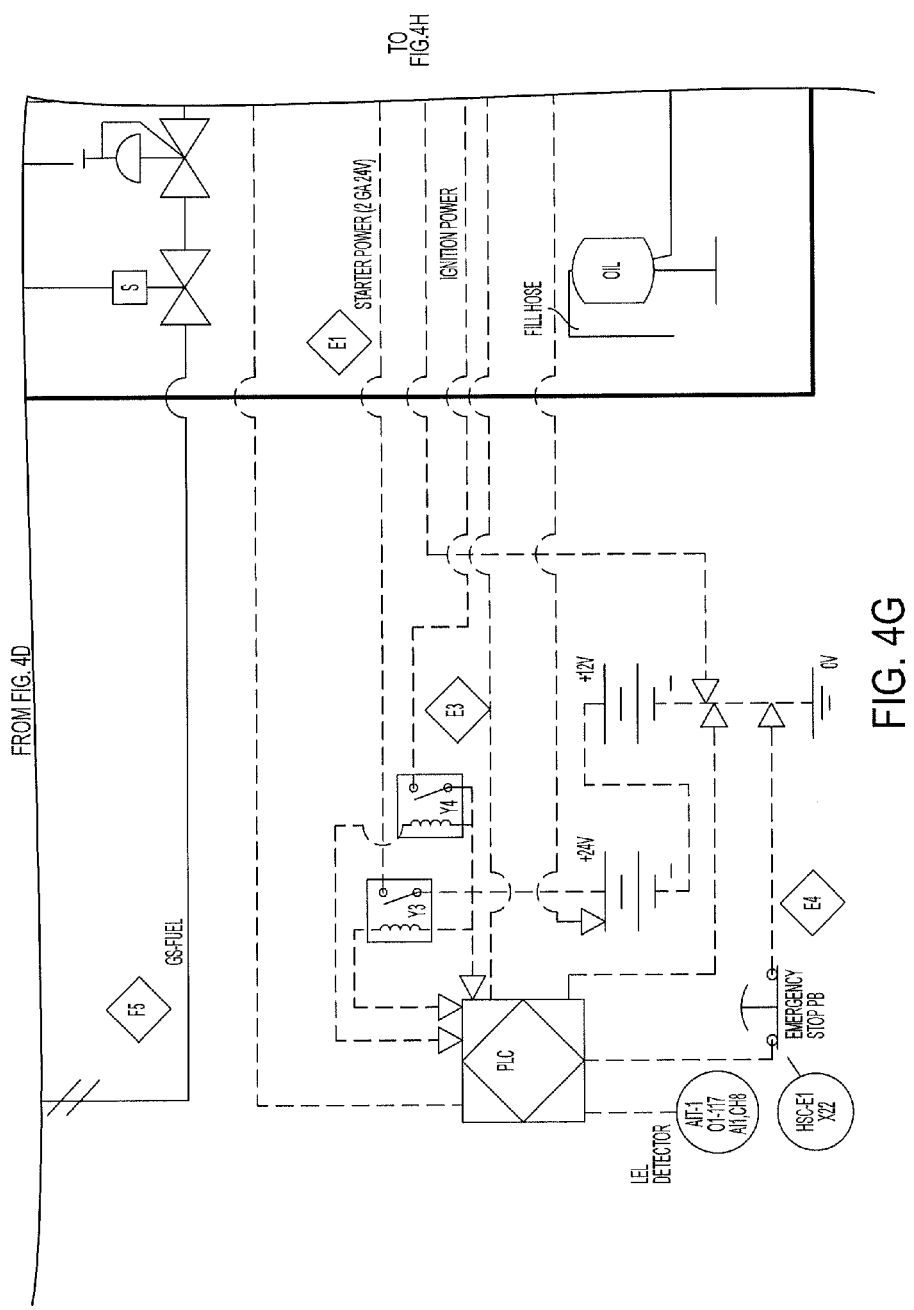

HYDROCARBON VAPOR RECOVERY SYSTEM WITH OXYGEN REDUCTION

CROSS REFERENCE TO RELATED APPLICATIONS

This application is a continuation application of co-pending U.S. application Ser. No. 14/286,983 filed May 23, 2014 entitled "HYDROCARBON VAPOR RECOVERY SYSTEM WITH OXYGEN REDUCTION" which claims the benefit under 35 U.S.C. 119(e) to U.S. Provisional Patent Application No. 61/826,543 filed May 23, 2013 entitled "Hydrocarbon Vapor Recovery System With Oxygen Reduction" and to U.S. Provisional Patent Application No. 61/918,583 filed Dec. 19, 2013 entitled "Vapor Recovery Systems and Methods Utilizing Selective Recirculation of Recovered Gases" and is a continuation-in-part of U.S. patent application Ser. No. 13/365,247 entitled "Hydrocarbon Vapor Recovery System" filed Feb. 2, 2012 now U.S. Pat. No. 8,992,838 issued Mar. 31, 2015; the disclosures of each of these applications are hereby incorporated by reference in their entirety.

FIELD

This invention relates, in general, to systems and devices for recovering gaseous vapors from oil storage tanks.

BACKGROUND

In oil recovery and storage operations, hydrocarbon gases are produced from oil condensate storage tanks through flash losses, working losses, standing losses, and breathing losses, where liquid hydrocarbons evaporate into gaseous form. Working losses occur when the liquids are agitated, i.e., when new liquids are pumped into the tanks; breathing losses are primarily the result of diurnal heating of the tanks; and flash losses occur as the result of a sudden pressure drop which occurs when liquid hydrocarbons move from a separator that operates at elevated pressures (i.e. approximately 30-500+ psig) to an oil condensate storage tank at much lower pressure (i.e., 0 to 1 psig). Flash losses account for a significant portion of total losses. Collectively, these losses of hydrocarbon gases are referred to herein interchangeably as "flash emissions," "vent gas," "flash gas," "vapor," "emissions" and combinations thereof.

Vapor emissions include Volatile Organic Compounds (VOC) and therefore pose a hazard to air quality as they form ground level ozone when they react with NOx. Historically, such vent gases were vented through relief valves of the storage tanks into the atmosphere.

To protect the environment and the health of the public at large, the permissible levels for ground level ozone and, in turn, uncontrolled flash emissions from oil storage tanks are regulated by various regulatory agencies at federal and state levels. Methods of flash emissions control include flaring, where the flash emissions are burned off, and more advanced systems of vapor recovery that capture, compress, and inject these flash emissions into nearby gas gathering pipelines, such as described in U.S. Pat. No. 7,350,581.

Vapor recovery systems have been developed that capture flash emissions using flexible storage tanks (also known as "bladders") at or near the front end of such systems, such as described in co-pending U.S. patent application Ser. No. 13/365,247 filed by the present inventors, and such bags/flexible storage tanks accommodate for surges in the vapor emissions. These flexible storage tanks in the vapor recovery systems can be useful in applications where the associated flash emissions may be produced intermittently, such as with vertical or directional wells.

However, use of flexible storage tanks/bags in vapor recovery systems is primarily utilized to mitigate flash gas surges associated with intermittent production methods (i.e. plunger lift well operation) and can increase the size/footprint of such vapor recovery systems, which may be inappropriate for some situations.

SUMMARY

The present inventors have recognized that in many situations, such as with newer horizontal shale wells, production of vapor emissions from the wells/tanks can be relatively steady at times and therefore the present inventors have recognized that vapor recovery systems can be formed in a smaller footprint without use of flexible storage tanks. The present inventors have also recognized the need, in some circumstances, for reducing the oxygen content present in recovered vapors.

In light of the above and according to one broad aspect on an embodiment of the present invention, disclosed herein is a system for recovering vent gas emissions from one or more oil storage tanks, without the use of a bladder or flexible storage tank at the front end of the system. In one example of the invention, the system may include a series of scrubber vessels and associated stages of compression receiving the vent gas emissions, the scrubbers removing the liquid content from the vent gas and the compressor compressing the vent gas into a pipeline; an oxygen reduction subsystem receiving the compressed gas, the oxygen reduction subsystem reducing an amount of oxygen (in the form of diatomic oxygen also known as $O_2$ or dioxygen) from the compressed gas; and a controller for controlling the operation of the system. In this manner, the resulting compressed oxygen-reduced gas that has been recovered can meet specifications required by many pipelines and be injected into a sales gas line, under certain conditions.

In one example, the oxygen reduction system includes a first reactor/vessel containing a sulfur scavenging material (i.e., zinc oxide) to remove sulfur from the heated compressed gas, in series with a second vessel/reactor including an oxygen reducing catalyst (i.e., palladium, platinum, or possibly other noble metals). In another embodiment, these materials (i.e., zinc oxide and catalysts) can be arranged in series and housed within the same vessel/reactor.

The oxygen reducing subsystem may also include an oxygen sensor or oxygen sensors to detect the oxygen content of the compressed recovered gas. If the controller determines that the recovered compressed gas output from the oxygen reducing system contains an amount of oxygen in excess of an oxygen-content specification, the controller diverts the compressed gas into a recirculation line so the system can re-process this gas until sufficient levels of oxygen are removed. If the controller determines that the recovered compressed gas contains an amount of oxygen in compliance with an oxygen-content specification, the controller directs the recovered compressed gas to the gas pipeline for use and sale. In this manner, the system ensures the recovered gas is injected into the sale gas pipeline only if it is within oxygen-content specifications.

In accordance with another broad aspect of another embodiment of the present invention, disclosed herein is a system for reducing oxygen present in vapors from oil storage tanks. In one example, the system may include an inlet that receives the vapors from at least one oil storage tank; a heating device coupled with the inlet, the heating system heating the vapors to a first temperature to form heated vapor; and at least one vessel coupled with the heating system, the vessel receiving the heated vapor, the vessel containing at least one catalyst to reduce dioxygen ($O_2$) from the heated vapor when the heated vapor passes through the vessel.

In one example, the catalyst includes palladium. The vessel may include a material to remove sulfur from the heated vapor. The material may include zinc oxide.

In another example, the vessel includes a first section and a second section positioned in series, wherein the first section includes the material to remove sulfur and the second section includes the at least one catalyst, such that the heated vapor passes through the first section and second sections in sequence.

In another embodiment, the vessel may include a first reactor and a second reactor positioned in series, wherein the first reactor includes the material to remove sulfur and the second reactor includes the at least one catalyst, such that the heated vapor passes through the first reactor before passing through the second reactor.

The system may also include a compressor connected between the inlet and the heating system, the compressor receiving the vapors and compressing the vapors.

The system may also include a controller monitoring the $O_2$ content in the heated vapor. In one example, the controller directs the flow of the heated vapor to a gas pipeline if the $O_2$ content is below a predetermined level—in other words, if the recovered gas has an acceptable and compliant level of $O_2$ content, then the recovered gas is directed to the sales gas pipeline.

In another example, the controller directs the flow of the heated vapor to a flare for burn off if the $O_2$ content is above a predetermined level, for instance, if the $O_2$ content is unacceptably high for use. In another example, if the $O_2$ content is above a predetermined level, the controller may direct the flow of the heated vapor to be re-circulated within the system so that the system can continue to process the recovered heated vapor and reduce the $O_2$ content therein.

The features, utilities and advantages of the various embodiments of the invention will be apparent from the following more particular description of embodiments of the invention as illustrated in the accompanying drawings.

BRIEF DESCRIPTION OF THE DRAWINGS

FIGS. 4A-4I illustrate respective portions of an example of a hydrocarbon vapor recovery system, in accordance with one embodiment of the present invention.

DETAILED DESCRIPTION

As shown in FIGS. 1-12 and as described herein, various embodiments of a hydrocarbon vapor (i.e., natural gas) recovery system 20 are disclosed. As described herein, embodiments of the invention provide for safe, efficient, and reliable recovery of substantial amounts of hydrocarbons and natural gas present in vent gas emissions, while preventing, through the use of an oxygen reduction system or sub-system 22 that reduces amounts of diatomic oxygen (also known as $O_2$ or dioxygen) from the recovered gas, thereby preventing concentrated oxygen from entering the sales gas pipeline 24. As used herein, embodiments of the disclosure will be described as removing "oxygen" from the recovered gas or testing the "oxygen" concentration in recovered processed gas, and it is understood that this includes the testing and removal of diatomic oxygen (also known as dioxygen and $O_2$) from the recovered gas. In this regard, as used herein the term "oxygen" includes diatomic oxygen, dioxygen and $O_2$.

Figure 1:
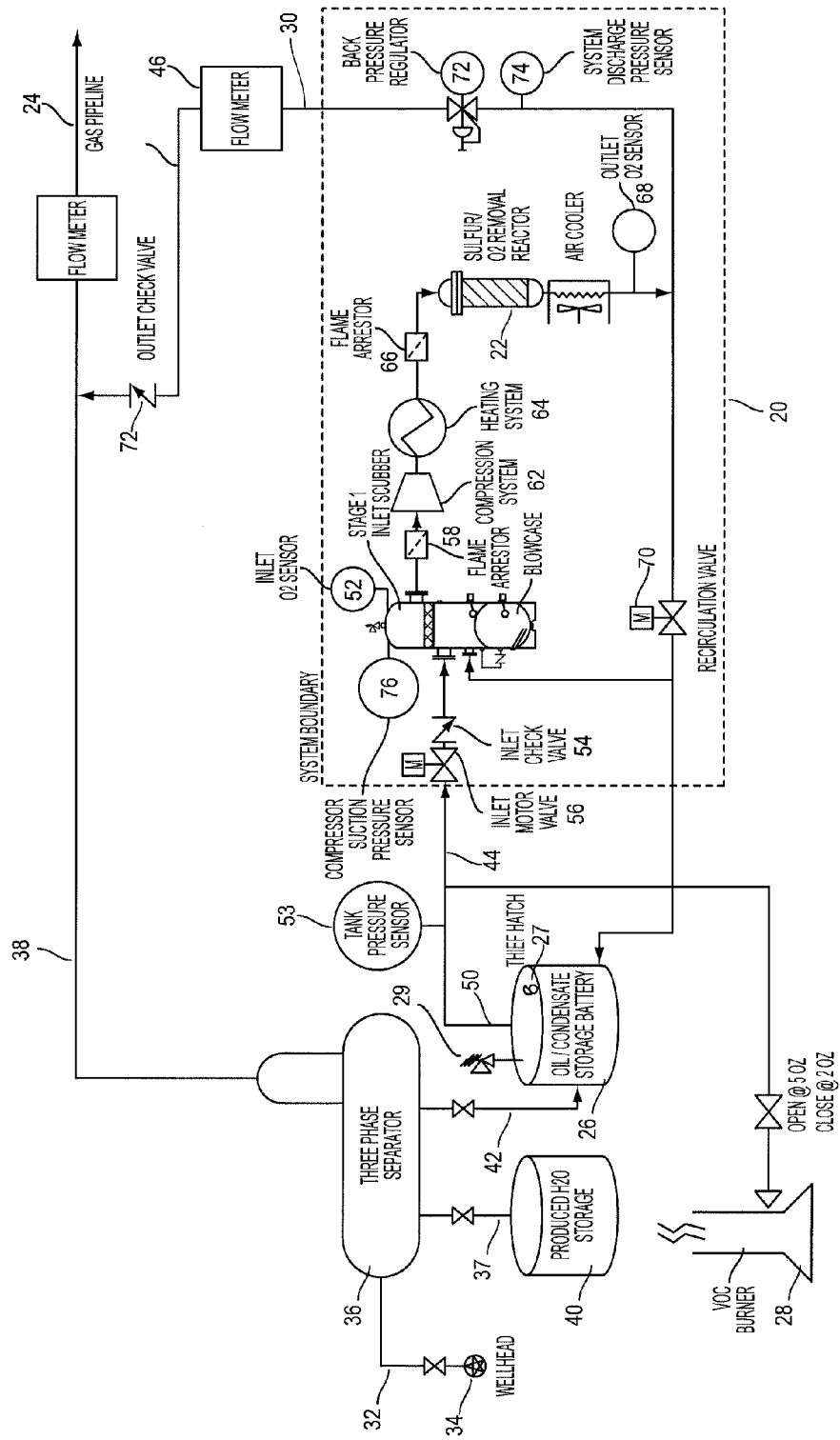
FIG. 1 illustrates an example of a block diagram of a hydrocarbon vapor (i.e., natural gas) recovery system that includes an oxygen reduction system, connected with an oil condensate storage tank, a flare or incinerator, and a sales pipeline, to provide recovered vapor to the sales pipeline, in accordance with an embodiment of the present invention.

In accordance with an embodiment of the present invention and referring to FIG. 1, an example is shown of a hydrocarbon recovery system 20, having an oxygen reduction system 22, connected with one or more condensate storage tanks 26 (with a thief hatch 27 and relief valve 29), a flare 28, and a sales gas pipeline 24 to provide recovered vapor 30 to the sales gas pipeline 24.

As fluids (i.e., oil, gas, and/or water) 32 are produced in production wells 34 and brought to the surface by sufficient reservoir pressure or by means of an artificial lift (not shown, i.e. plunger lift), such oil/fluids 32 are introduced into a separator 36 (such as a three-phase separator), which separates three components of the liquid flow 32 from the wellhead 34—natural gas 38, oil 42 and water 37. Most natural gas wells 34 produce natural gas and liquids, including liquid-phase hydrocarbons and water. Liquids are removed from the produced stream 32 by a separator 36 immediately downstream of the production wellhead 34. The separator 36 separates liquid $H_2O$ (shown as 37) and sends it to water vault(s) 40, while liquid hydrocarbons (also known as oil condensate 42) are sent to large oil condensate storage tank(s) 26 that typically maintain pressures from atmospheric pressure to 1 psig. The separator 36 also sends the natural gas 38 to the sales pipeline 24 for further conventional processing downstream.

The separator 36 typically operates at sales pipeline pressure which can typically range from 20 psig to over 500 psig, significantly higher than atmospheric pressure. The storage tank 26 is typically at a much lower pressure, typically between 0 to 1 psig, with 1 psig being a maximum allowable working pressure for many oil condensate storage tanks 26. Accordingly, as oil 42 moves from the separator 36 to the storage tank 26, vent gases/vapor emissions 44 are created (the terms vent gas, vent gas emissions, vent gas vapor emissions, flash gas, emission vapors, flash emissions, vapor, emissions, and combinations thereof are used interchangeably herein).

In one example, the inlet of the recovery system 20 (including oxygen reduction system 22 in this example) is plumbed in parallel with inlet(s) of the flare(s) 28, with both the vapor recovery system 20 and flare(s) 28 downstream of the storage tanks 26 so that the recovery system 20 can capture the vent gas emissions 44 and convert such vent gas emissions 44 to recovered vapor 30 to be sent to the sales pipeline 24. If needed, the flare 28 can also incinerate vent gas emissions 44 under certain circumstances, described below, for instance when the volume of vent gas emissions 44 surpasses the capacity of the recovery system 20, or when vent gas emissions 44 are contaminated with excessive oxygen/air. A flow meter 46 can be provided in-line with the output of the recovery system 20 to measure the amount of recovered vapor 30.

As shown in FIG. 1, from the one or more tanks 26, a manifold 50 is provided connecting the one or more tanks 26 to the suction of recovery system 20, and, in one embodiment one or more oxygen sensors 52 detect the oxygen content of the gas/vapor 44 at the inlet to the recovery system 20. A pressure sensor 53 measures the pressure of the vent gas 44 at the inlet to the system 20, which effectively is a measurement of the pressure in the tanks 26. In one example, the inlet oxygen sensor 52 includes a diaphragm pump, which provides enough motive pressure to move the gas stream through an oxygen sensor/analyzer; and after it has been analyzed, the sampled gas stream is sent back just upstream of the inlet motor valve 56 and the inlet check valve 54, in one example (see also FIG. 4 along Line P1). This front-end oxygen level detection provides a safety mechanism in that vent gas emissions 44 which are excessively rich or high in oxygen content are burned off at the flare 28 and not recovered by the system 20. Stated differently, the recovery system 20—through the use of the inlet oxygen sensor 52—detects whether the vent gas emissions/ vapors 44 are contaminated with excessive amounts of oxygen/air (i.e., more than 3% concentration by volume or more depending upon the implementation). If so, the inlet valve 56 of the recovery system 20 closes, which has the effect of sending the recovery system 20 into full recirculation mode and these highly-contaminated vent gas emissions 44 are subsequently incinerated by the flare 28.

If the controller 60 (see FIGS. 2-3) determines that the flash emissions 44 are not contaminated with excessive oxygen/air (i.e., less than 3% concentration in one embodiment), then the inlet valve 56 opens, allowing the flash emissions 44 to be recovered by the recovery system 20.

Referring to FIG. 1, at the input to recovery system 20, the gas 44 is either directed to the burner 28 for incineration or to enter recovery system 20 through the series of inlet valve 56 (which can be a motor valve), check valve 54 (which can be a swing-type check valve), and a flame arrester 58. The opening or closing of inlet motor valve 56 is under the control of controller 60 (such as Programmable Logic Controller (PLC) 60 shown in FIGS. 2-3). When inlet motor valve 56 is open, gas 44 enters a compression system 62 (described below as including, in one example, a series of scrubbers and compressors) where the gas 44 is compressed and then heated through heating system 64, in one example of this disclosure.

After the gas 44 is heated by heating system 64, the gas 44 passes through another flame arrester 66 that quenches any flames that could propagate back or upstream, and then enters an oxygen removal subsystem 22, described in greater detail below, which includes, in one example, one or more reactors or vessels which remove or reduce oxygen (e.g., dioxygen $O_2$) from the gas stream. An outlet oxygen sensor 68 monitors and detects the oxygen concentration level present in the gas exiting the oxygen reduction system 22. The gas output 30 from the oxygen reduction system is either, under the control of controller 60, passed to the sales pipeline 24 by closing recirculation valve 70, or internally recirculated by opening recirculation valve 70 (which is also under the control of controller 60). During full recirculation, inlet motor valve 56 is 100% closed in one example. However, if a lesser volumetric flow rate of gas enters the recovery system's inlet motor valve 56, when compared to the compressor's capacity at a given operating speed, the recirculation valve 70 partially opens to provide "make-up" volume in order to maintain a set pressure in the $1^{st}$-Stage inlet suction scrubber vessel. The proper amount of recirculation valve 70 lift is determined by the controller 60 closed control loop (which can be a PID or PI loop).

In one example, four conditions can cause controller 60 to close the inlet motor valve 56 and subsequently place the recovery system 20 in a full recirculation mode that recirculates gas 44 internally within recovery system in such a way that all gas volume that passes through the compressor is supplied by the recirculation line alone such that no gas volume enters through the inlet valve 56 of recovery system 20: i) if there is low pressure upstream of the inlet check valve 54 (as measured by pressure sensor 53) being drawn off of the oil tanks 26 (such as, by way of example, a positive pressure of 0.25 oz/in$^2$ or less, which indicates that there is little or no vent gas 44 in the tanks 26), ii) if there is too much oxygen detected by O2 sensor 52 in the gas 44 present at the inlet of system 20 (such as, by way of example, an oxygen concentration of greater than 3 percent in one example), iii) if there is too much oxygen detected by sensor 68 at the outlet of the system 20 (such as, by way of example, an oxygen concentration of greater than 10 ppm), or iv) if the pressure measured at either the final stage of compression discharge or reactor gets to be close to the high-pressure shut down setpoint (i.e., within 20 psi in one example), which could be caused by a blockage or freeze in the sales pipeline—if any of these conditions occur, then the gas present at the outlet of recovery system 20 is recirculated through recirculation valve 70 back into the inlet of recovery system 20. If none of these conditions are present, then the recirculation valve 70 is fully closed and the gas 30 at the outlet of system 20 (exiting from oxygen reduction system 22) is not recirculated through system 20 and is instead passed through flow meter 46 and outlet check valve 72 to the sales pipeline 24.

In FIG. 1, a back pressure regulator 78 (also shown as PCV-P4 in FIG. 4) allows the system to depressurize by evacuating all gas contained within piping, reactor vessels, heat exchangers, coolers, scrubbers, and the compressor back to the oil storage tanks. In the event of either an automated or operator-induced shut down, in one embodiment, the recirculation valve 70 opens to allow pressurized gas to travel through the recirculation valve. The piping downstream of the recirculation valve sends gas to both the inlet scrubber as well as the inlet of the back pressure regulator 78. The back pressure regulator 78 is set, in one embodiment, to 5 psig. As pressurized gas moves through the recirculation valve to the piping and first stage inlet scrubber (which in one example is held to around zero psig during normal operation), the pressure downstream of the valve rises in an attempt to reach equilibrium across the valve. Once the pressure in contact with the inlet of the back pressure regulator 78 rises above its setpoint (i.e., 5 psig in one example), the back pressure regulator 78 opens and allows this pressurized gas to evacuate back to the oil storage tanks. The flares on location will incinerate this gas as the oil storage tank pressure rises.

The control of the recirculation valve 70 to allow depressurization during the event of a shutdown can be accomplished in a number of ways. One way is open up the valve to a static position (i.e., 50%, 100%, or any other amount above 0%) and allow the gas to move through the open valve in an attempt to equalize pressure across the valve. Another method of control is to continue to use the controller 60 (i.e., closed-loop PI or PID controller of FIG. 3) and shift the desired pressure setpoint of the first stage inlet scrubber that is higher than the setpoint of the back pressure regulator 78. In this method of control, the position of the valve will vary to keep the pressure in the first stage inlet scrubber no higher than the setpoint programmed into the controller. Because the gas in the scrubber and downstream of the recirculation valve is also in contact with the inlet of the back pressure regulator 78, the back pressure regulator 78 will allow gas to move through it as long as the gas pressure is higher than the back pressure regulator's setpoint, effectively depressurizing the system.

Figure 2:
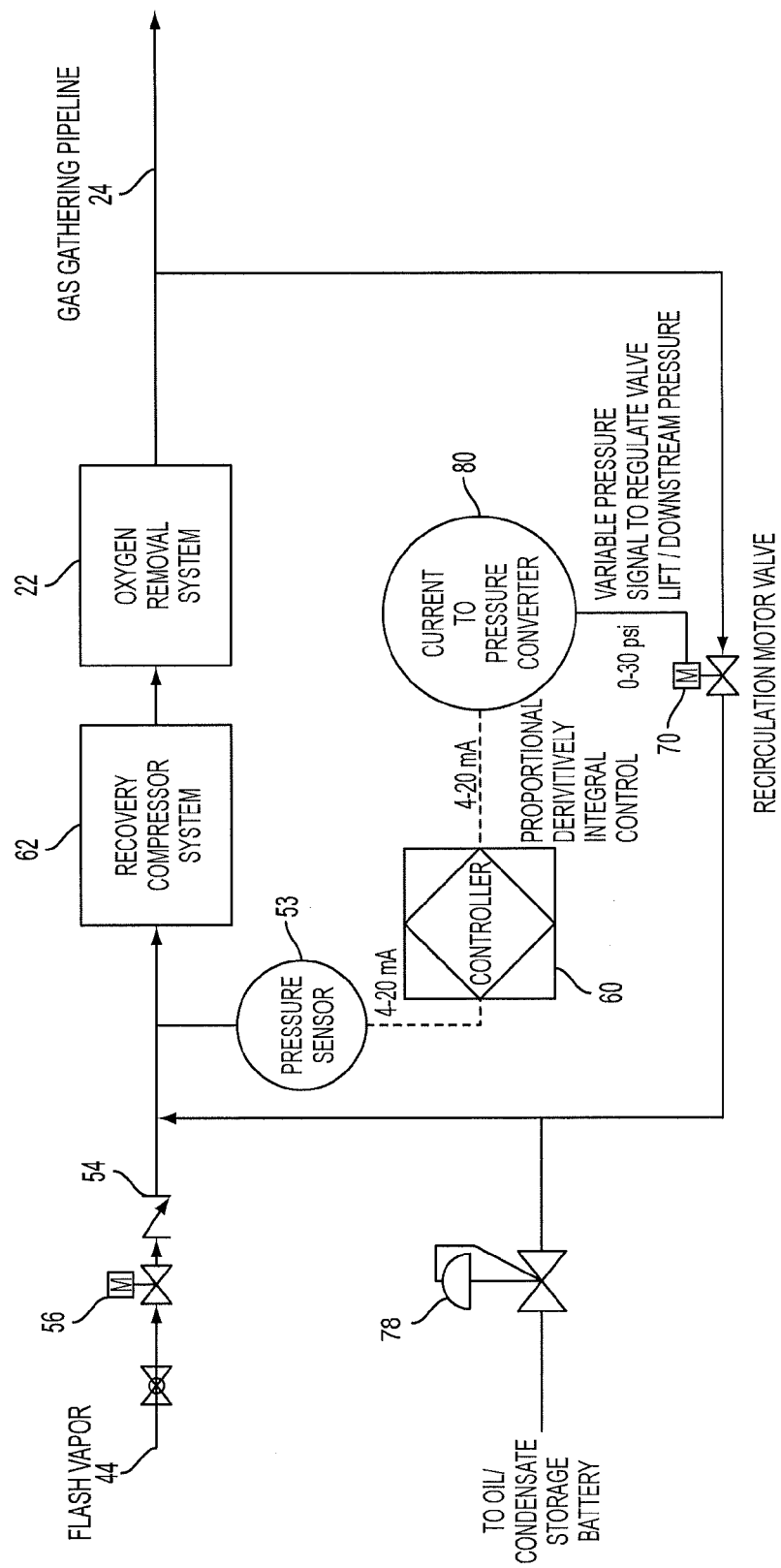
FIG. 2 illustrates an example of a block diagram of a vapor recovery system having a recirculation pressure/flow regulation system control valve and configured for internal recirculation of the recovered gas, in accordance with one embodiment of the present invention.

FIG. 2 shows a block diagram of a controller 60 receiving a signal from a pressure sensor 53 at the inlet of the recovery system 20 (controller 60 also receives other input signals such as a signal from the oxygen sensor 52 at the inlet to the system 20 and a signal from the oxygen sensor 68 at the outlet of system 20); and controller 60 has an output signal that is coupled to the Current-to-Pressure converter 80 (FIG. 2) that controls the recirculation motor valve 70. In this way, controller 60 can detect whether various conditions for recirculation are present or not, and controller 60 controls the position of recirculation motor valve 70 to permit recirculation to occur (and if so, controller 60 can also finely adjust the amount or level of recirculation to achieve a desired pressure level at the input of system 20 as detected by pressure sensor 76) or to permit gas to be directed out of recovery system 20 to sales pipeline 24.

As described above, gas is recirculated through recovery system 20 if there is low pressure in the oil tanks 26 (such as, by way of example, a positive pressure of 0.25 oz/in$^2$) which indicates that there is little or no vent gas 44 in the tanks 26. In this manner, when no vent gas 44 is present, the recirculation of gas within the system 20 will have the effect of maintaining system 20 operating continuously with both reactors of the oxygen removal system 22 maintaining high enough temperatures to remove oxygen, ready for when greater amounts of oxygen-contaminated vent gas 44 become present in the tank 26.

Recovery system 20, in accordance with various embodiment of the present invention, can be used in various environments or situations where the production of vent gases 44 from tanks 26 is regularly occurring, such as where vent gases are typically present during operation of wells 34. Recovery system 20 can be particularly useful to recover vent gas emissions 44 for new or newer wells 34 with high production rates of liquid hydrocarbons that typically produce substantial amounts of vent gas emissions 44.

It can be seen that recovery system 20 operates without a bladder or flexible storage tank collecting vent gas 44 at the front end of the system, and instead system 20 can operate continuously, always capable of processing vent gas 44. Since no bladder is used in system 20, the size and footprint of system 20 can be reduced when compared to some systems that use a bladder to gather and collect gas.

Figure 3:
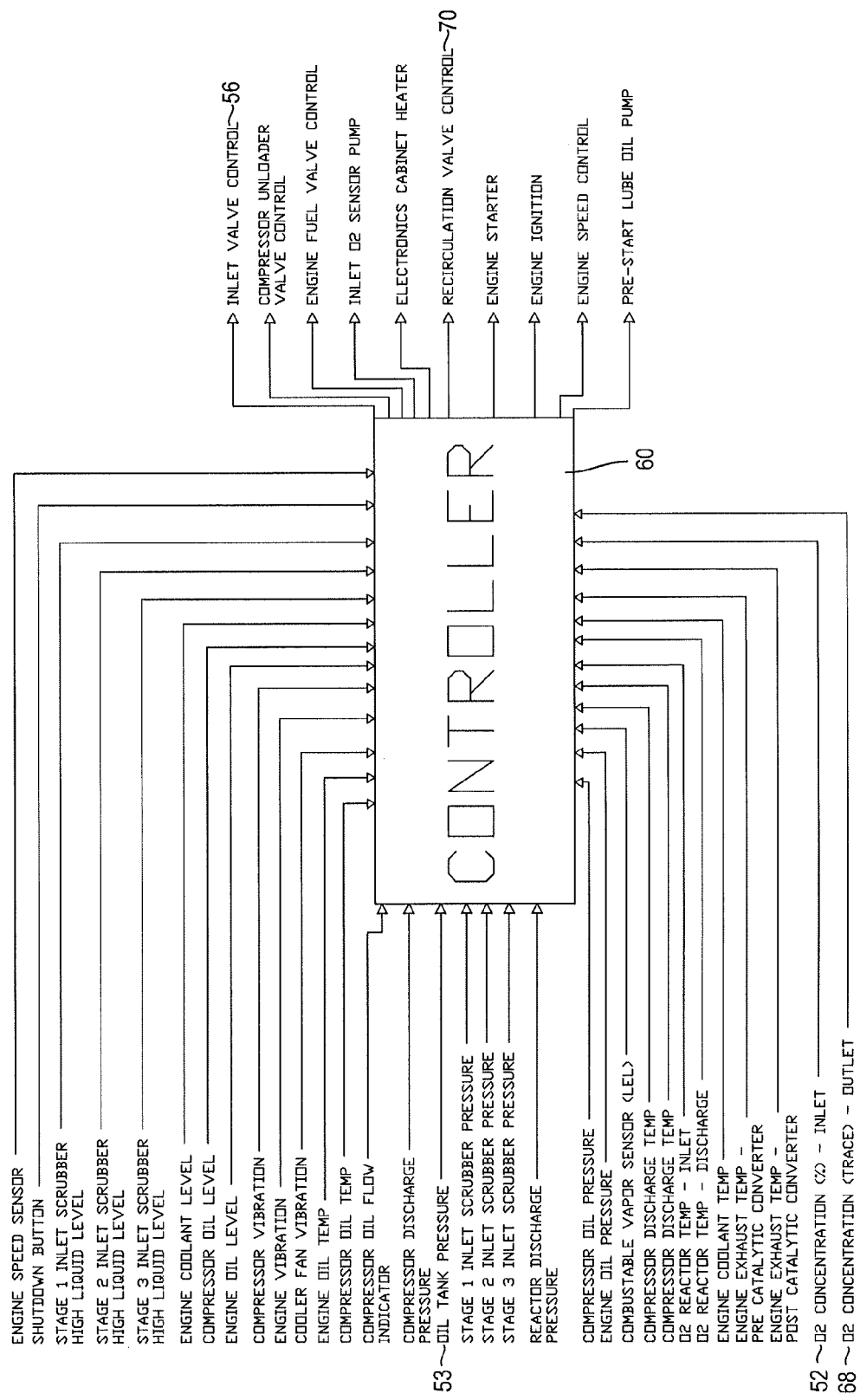
FIG. 3 illustrates an example of a controller for a hydrocarbon vapor recovery system, in accordance with one embodiment of the present invention.
Figure 4A:
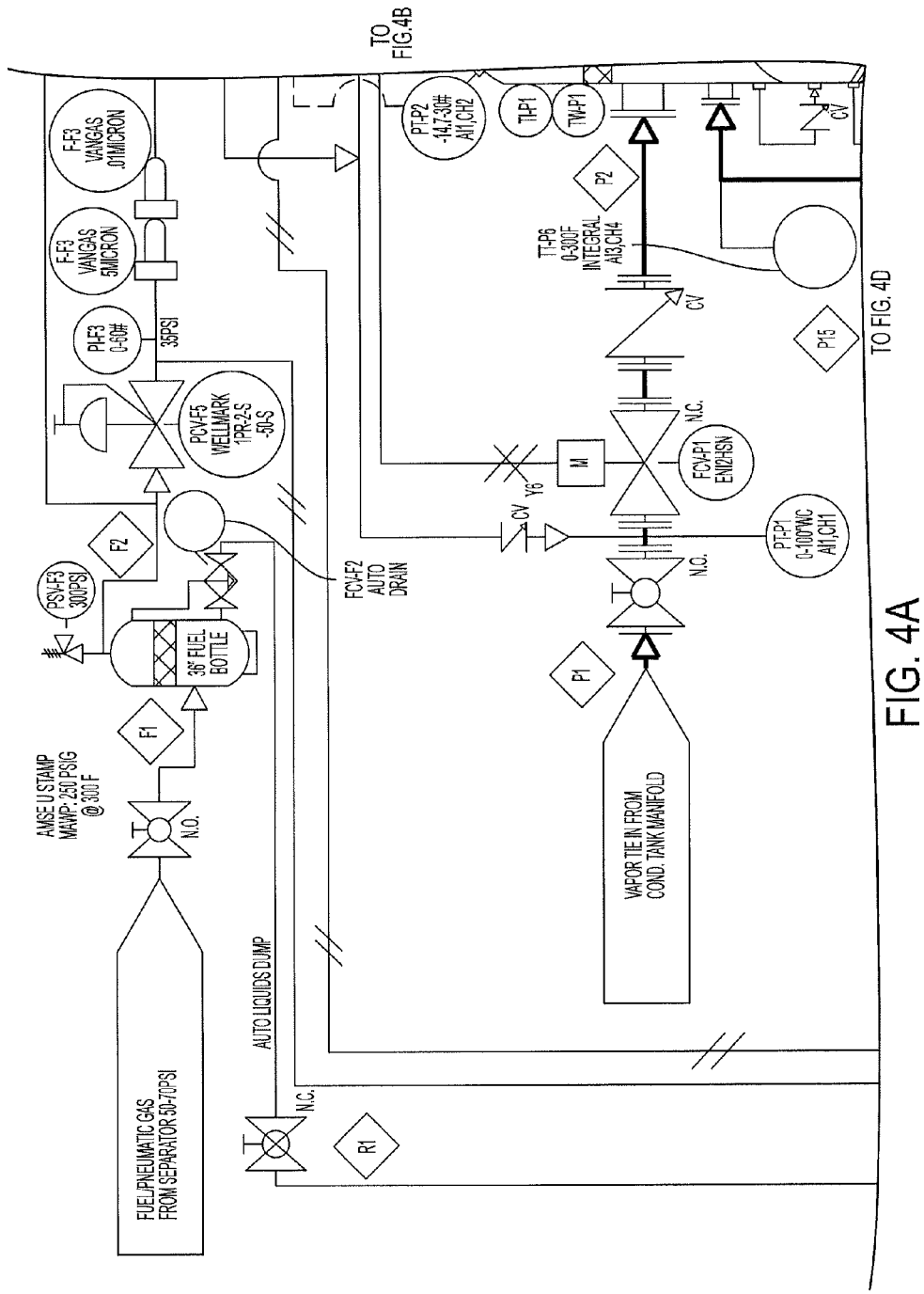
Figure 4B:
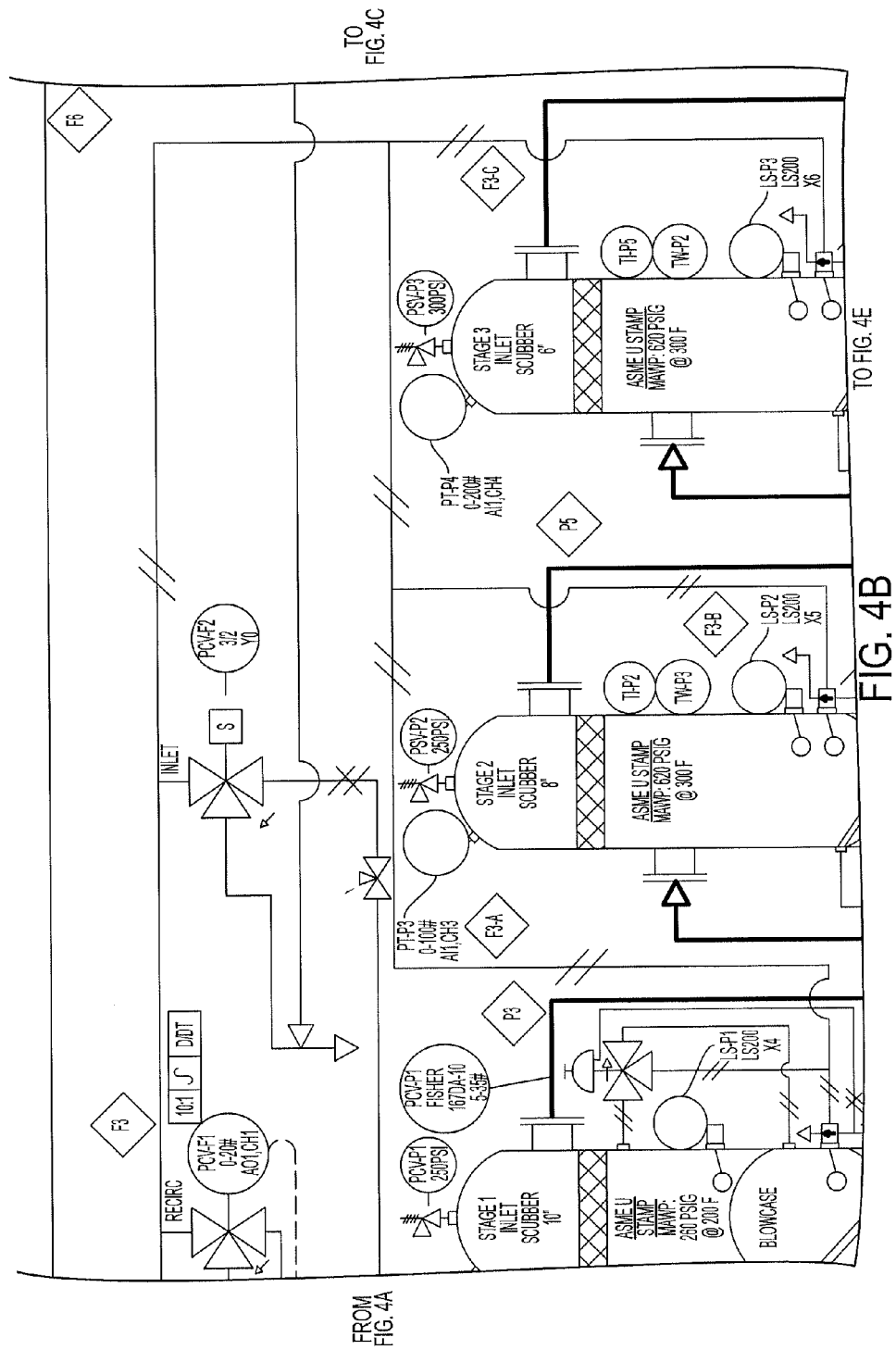
Figure 4C:
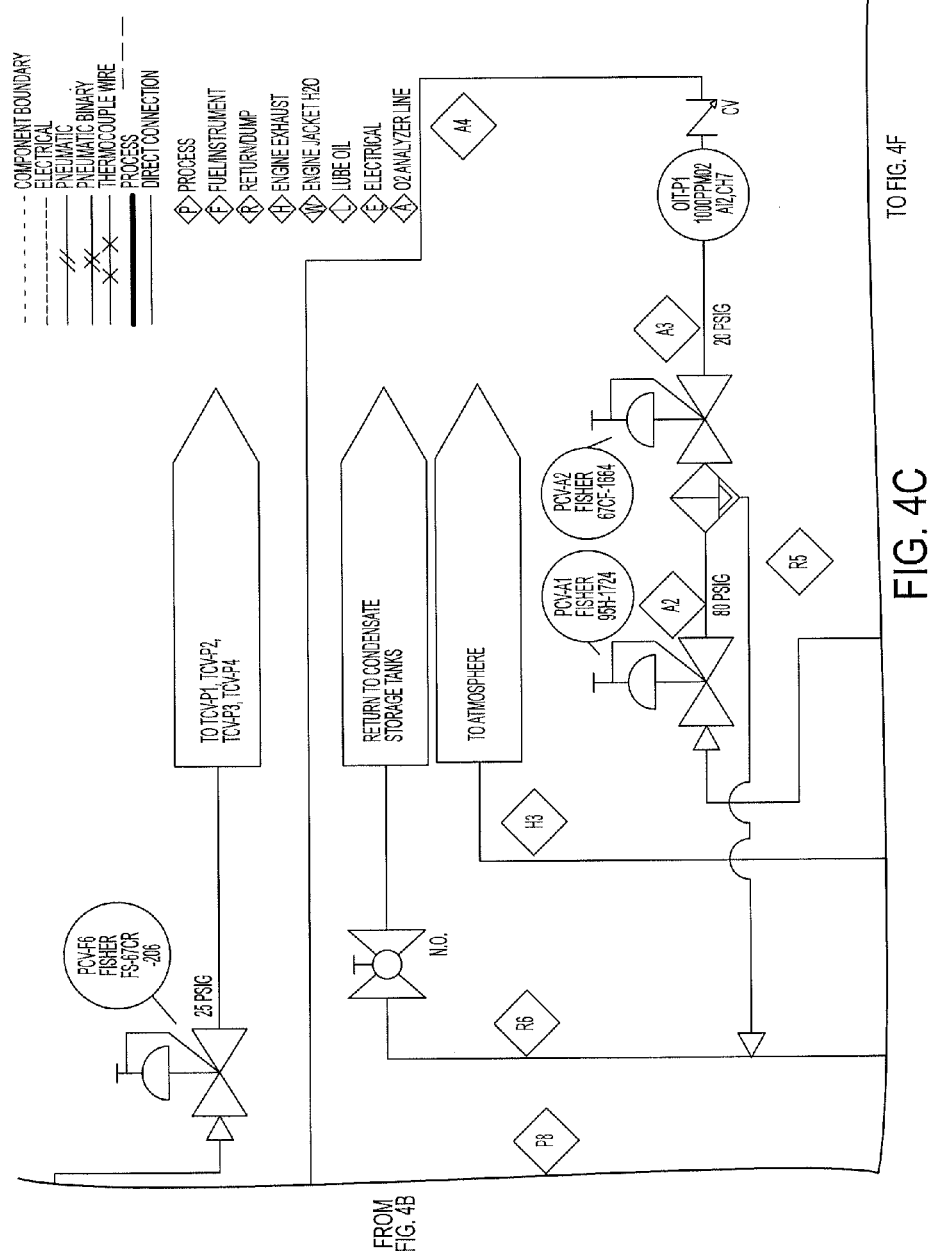
Figure 4D:
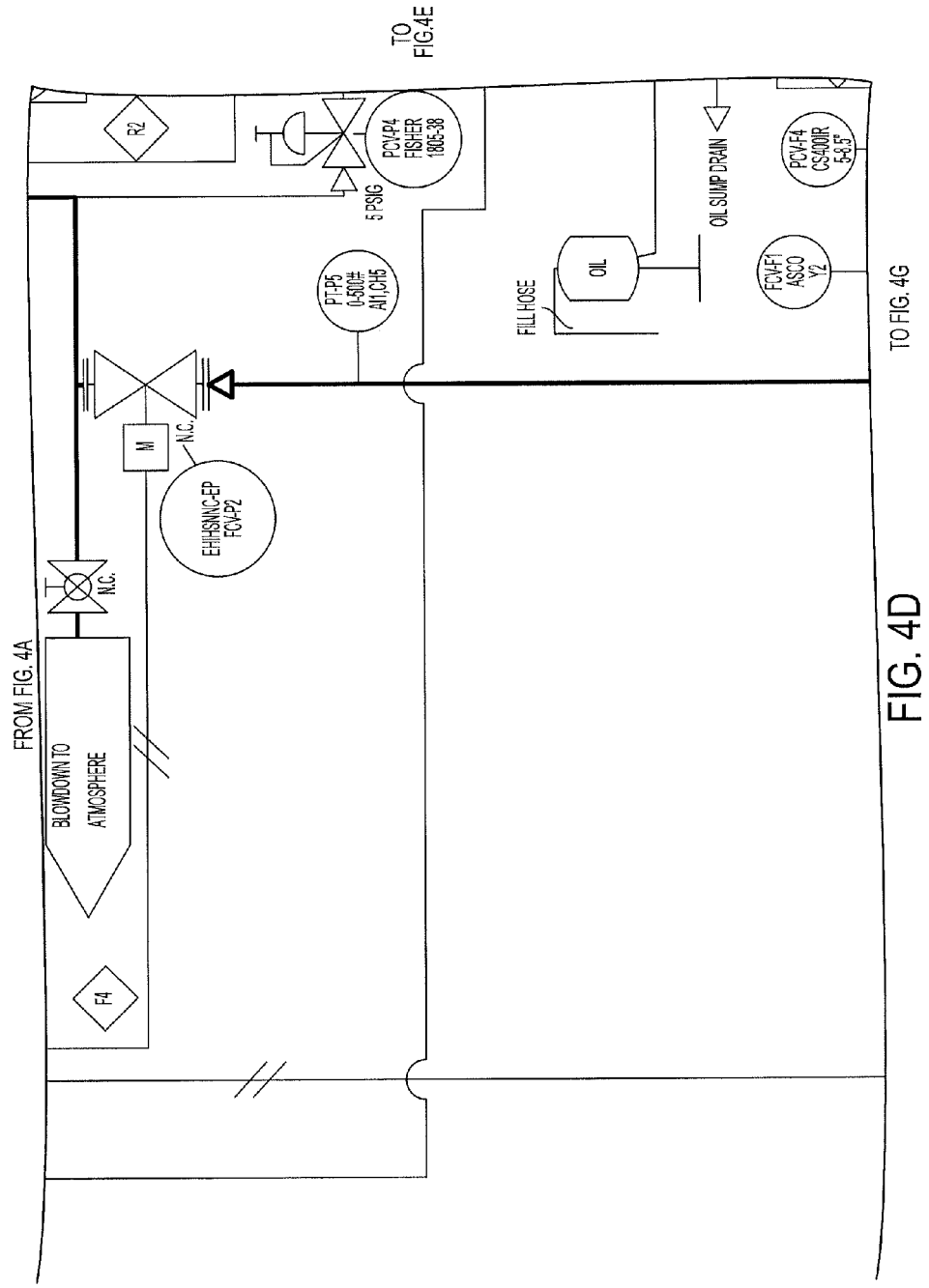
Figure 4F:
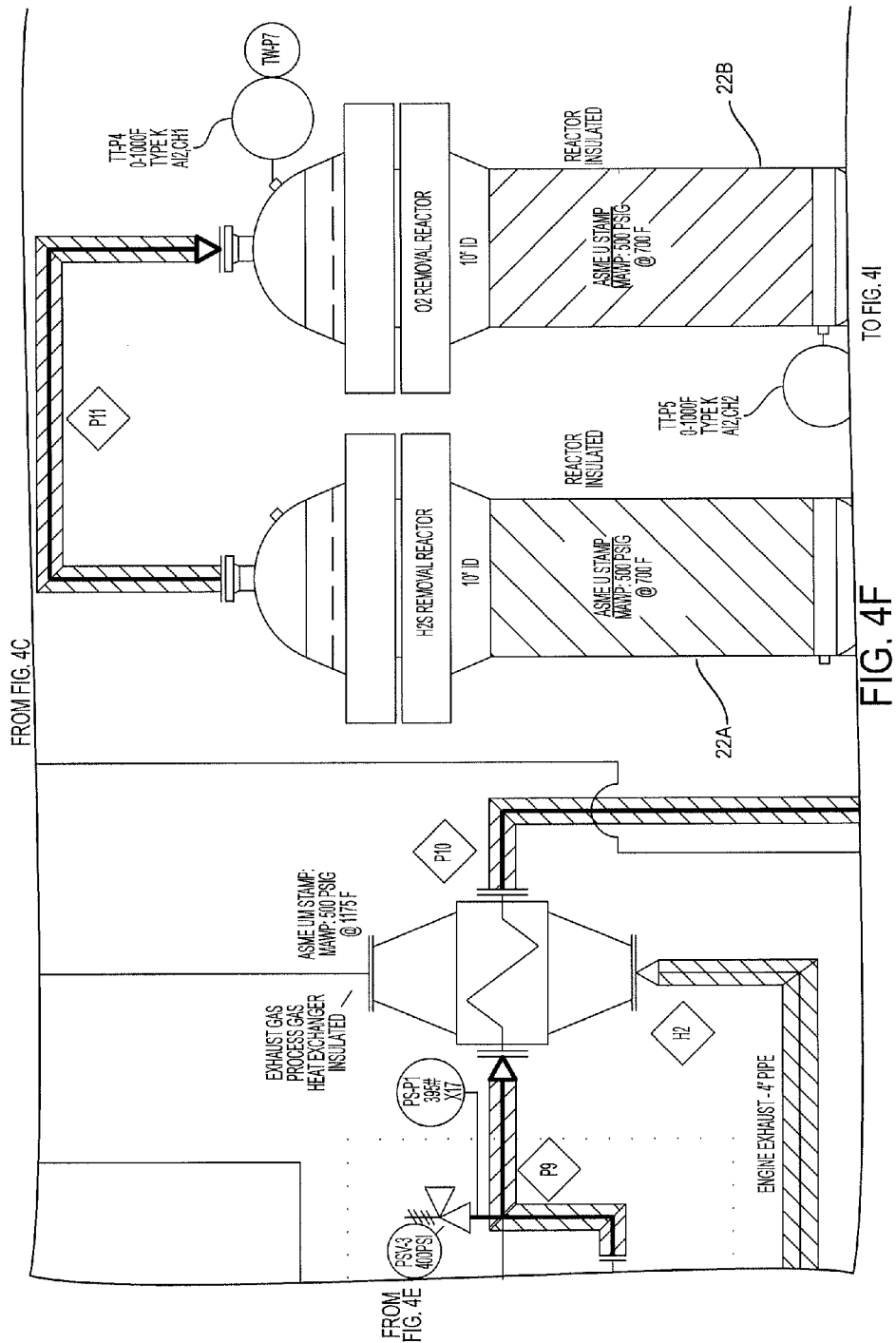
Figure 4H:
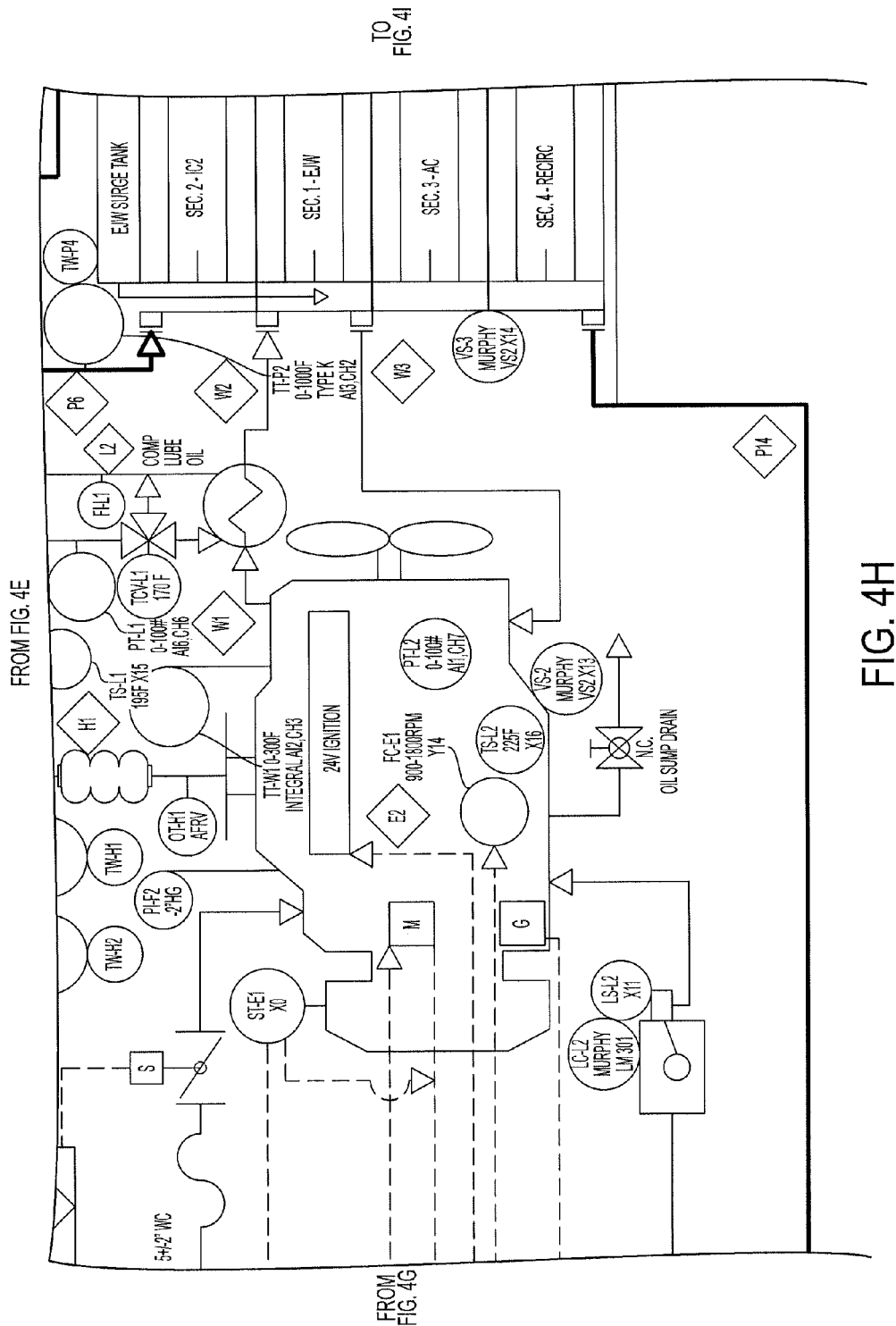
Figure 4I:
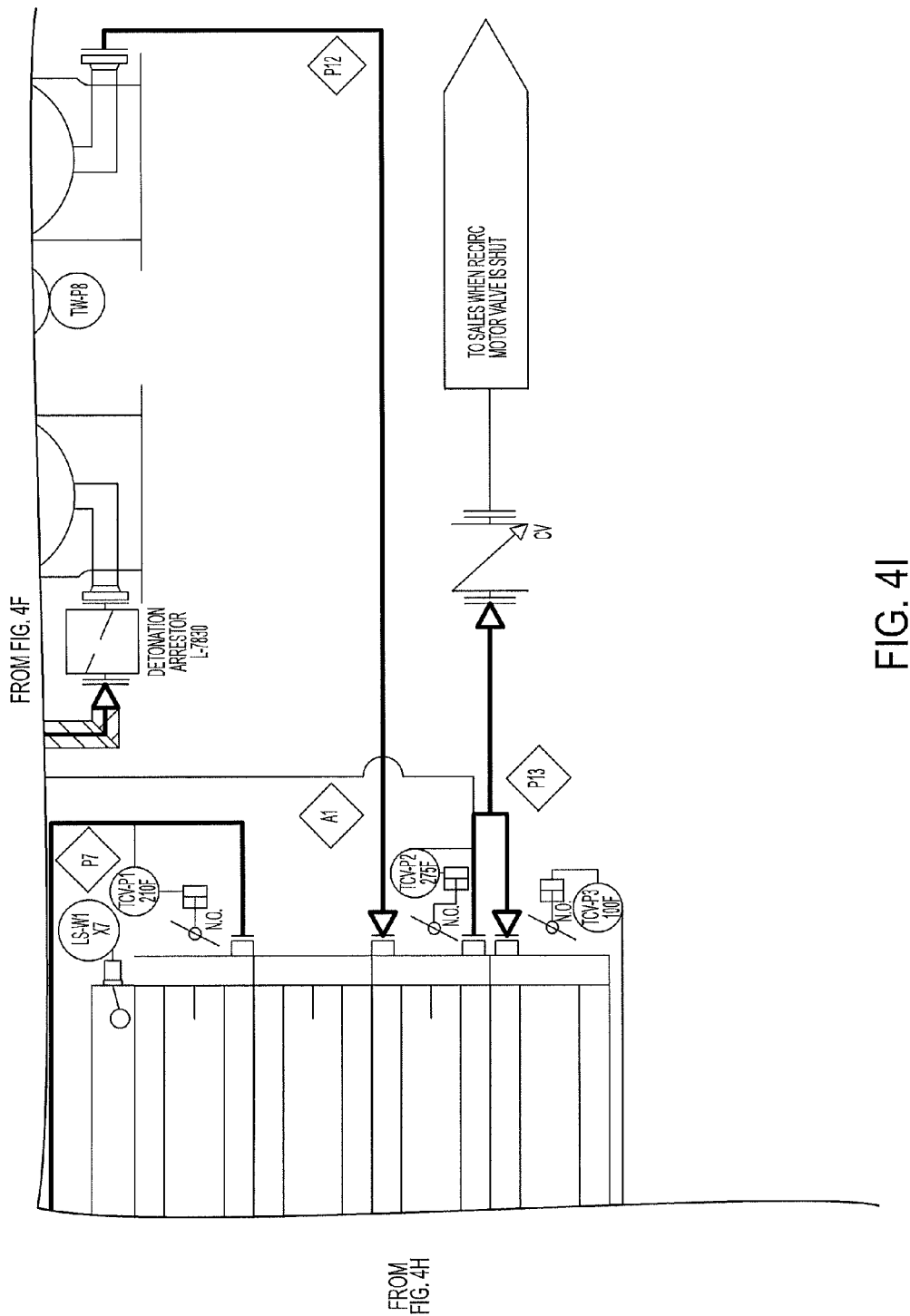

FIG. 3 illustrates a controller 60 (such as a Programmable Logic controller (PLC)) with various inputs and various output signals in accordance with one embodiment of the present invention, and FIG. 4 illustrates an example of a specific implementation of a recovery system 20, in accordance with one embodiment of the present invention. FIGS. 3-4 will be referenced in the following description of an example of an embodiment of the invention.

In one example, gas 44 enters recovery system 20 along process line P1, shown in FIG. 4, through a check valve 54 and a normally-opened ball valve in series with inlet motor valve 56. In one example, the ball valve is a manual operated valve, and should only be closed if the system is being shut down or relocated. During normal operation, the ball valve will remain open.

Inlet motor valve 56 can operate as a flow control valve and remain opens unless any of the four conditions, described above, occur either alone or in combination, such that the recovery system 20 is in a recirculation mode; and if those conditions occur, then the inlet motor valve 56 will be closed and recirculation valve 70 will be opened.

Along process Line P2 in FIG. 4, the vent gas 44 goes into a first stage inlet scrubber with a blow case. The blow case pushes any liquids that collect at the bottom of the scrubber out of the vessel. In this case, the liquids are sent out to the same tanks 26 where the vapors 44 came from through a separate line. The scrubber scrubs out the liquids through means of reducing the stream's velocity in a vessel with a larger diameter than inlet and outlet piping. Since liquids are no longer entrained in fast a moving gas stream and are denser than the gas, gravity causes the liquids fall to the bottom in the scrubber while the gas moves to outlet nozzle located near the top of the scrubber vessel. Gas 44 exits the first stage scrubber (shown as Line P3 in FIG. 4) and enters a flame arrestor just before the first stage of compression. The flame arrestor is used as a safety measure, in the unlikely event of a flammable gas mixture with a source of ignition the first stage cylinder, to prevent flames from traveling upstream.

In one embodiment, the first stage of compression compresses the gas 44 from atmospheric pressure to approximately 35 to 39 psig, depending on discharge pressure. A vibration sensor is provided on the compressor to detect any mechanical problems with the compressor that could cause it to become unbalanced and vibrate during operation. A temperature sensor is provided at the discharge of the first stage compressor to ensure that the temperature of the gas stream is not excessive (i.e., not exceeding 20% above the expected discharge temperature, in one example 192 degrees Fahrenheit).

The compressed gas exits the first stage of compression, as shown as Line P4 in FIG. 4, where the gas enters a second stage scrubber which also separates and removes fluids from the gas stream. The liquids fall out of the gas stream in the second scrubber to the bottom of the scrubber vessel, while the gas flows to the top of the second scrubber and moves (shown as Line P5) into a second stage of compression. The second stage compressor increases the pressure of the gas stream to approximately about 146 psig, assuming 390 psig of discharge. A temperature sensor is provided at the discharge of the second stage compressor to ensure that the temperature of the gas stream is not excessive (i.e., not exceeding 307 degrees Fahrenheit).

The compressed gas stream exits the second stage compressor as shown at Line P6, where the gas stream then enters a section of the air-cooled heat exchanger which has 4 separate sections. In one example, where section one of the air-cooled heat exchanger (also referred to as "cooler") 72 is used as a radiator for the engine, Line P6 enters section 2 of the cooler 72, in one example, where the gas cools off to a certain point (i.e., 210 degrees Fahrenheit) prior to entry into the third stage of compression.

The gas steam, having exited section 2 of the cooler 72, then enters a third scrubber, which also separates and removes fluids from the gas stream. The gas stream exits the third scrubber as shown at Line P8, where it enters a third stage of compression. The third stage of compression is configured to compress the gas stream to a final discharge pressure, which will typically be approximately the same pressure as the gas sales line (such as, in one example, 390 psig).

In one example, a natural gas powered fired engine is used to drive the three stages of compression (which may be in for form of a multi-stage reciprocating compressor) that will pressurize the gas stream from at or just above atmospheric pressure to whatever the pressure of the gas gathering line is operating at.

The output of the third stage of compression is shown as Line P9, which is thermally insulated and coupled into a pressure safety valve. If the discharge pressure is too high (i.e., in excess of 400 psi), then the excess pressure is relieved through the pressure safety valve. The pressure and temperature of the gas stream coming out of the third compressor are measured before the gas enters an exhaust gas heat exchanger.

The exhaust gas heat exchanger takes hot exhaust gas from the engine and transfers heat into the gas stream to increase the temperature of the gas stream prior to the gas stream's entry into the oxygen reduction reactors. Increasing the temperature of the gas streamhelps initiate the catalytic oxygen removal reaction which removes oxygen from the gas stream.

The output of the heat exchanger is also thermally insulated, shown as Line P10, and enters the input of a first reactor, which is also thermally insulated and filled with sulfur scavenging materials that remove any sulfur that could be present in the gas stream which thereby protects a downstream oxygen removal catalyst that can be poisoned by any sulfur present in the gas stream.

The output of the first reactor is shown as Line P11, which is also thermally insulated and coupled with a second flame arrester prior to entry into a second reactor inside of which oxygen is removed through catalytic combustion with hydrocarbons present in the gas stream. Since the second reactor is removing the oxygen through combustion, the flame arrester prevents any flames from traveling back into Line P11 in the unlikely event that any flames are present in the second reactor.

In the second reactor, assuming the temperature of the gas stream is sufficiently high (i.e., 400 degrees Fahrenheit or above in one example), any oxygen present is reacted with the hydrocarbons in the gas stream and is subsequently removed and converted into both carbon dioxide and water in the process stream.

In an alternative embodiment, all catalytic materials (i.e., zinc oxide and oxygen reducing/removing catalysts) can be arranged in series and housed within the same vessel/reactor.

The output of the second reactor is shown as Line P12, where the gas stream is very hot at this point and is directed into Section 3 of the cooler to cool down the gas stream. The output of Section 3 of the cooler is shown as Line P13 which is either directed to the sales line 24, or for recirculation as previously described.

If the recovered vapor 30 is directed to the sales pipeline, no further cooling by the recovery system's cooler 72 is necessary because an elevated temperature (i.e., 250 degrees Fahrenheit) at and immediately downstream of Line P13 is desired in order to ensure that elements in the stream do not cool to the point of condensing to the liquid phase as a result of thermal losses to the pipe, ground, air, etc before passing through the custody transfer meter. When blended with traditionally produced natural gas 38 the resultant temperature can be tuned to be below whatever contractual temperature limitations are in place (i.e., 120 degrees Fahrenheit) by throttling the airflow across section 3 of the cooler 72.

If the recovered vapor 30 is directed to be recirculated through the recirculation valve 70, it can be further cooled to a lower temperature (i.e., 100 degrees F.) through section 4 of the cooler 72. Further pressure drop across recirculation valve 72 will ensure a further temperature drop of the gas stream by means of the Joules-Thompson effect. This will ensure that the gas stream in the recirculation line is at a low enough temperature (i.e., 100 degrees Fahrenheit or below) as it re-enters the $1^{st}$-Stage suction scrubber to ensure that there is no overheating of the mechanical equipment, including the compressor. Alternatively in another embodiment, this final section of cooling can be bypassed or omitted depending on characteristics specific to the site's production characteristics, ambient surroundings, gas composition, and discharge pressures, as long as the gas temperature in the recirculation line is cool enough not to damage either the recirculation valve or compressor and associated components.

Embodiments of an oxygen reduction system 22 will now be further described. In one example, the first and second reactors or pair of vessels (22A and 22B in FIGS. 4F and 5) may be implemented using generally elongated, cylindrical pressure vessels each having an input and an output end. An alternative embodiment could combine all catalytic materials (i.e., sulfur scavenging catalysts such as zinc oxide and oxygen removing/reducing catalysts such as palladium) within the same vessel/reactor, however, separate reactors/vessels for both sulfur will be discussed within for explanation purposes. The first pressure vessel 22A may include zinc oxide material (i.e., a bed of zinc oxide) or other material which acts as a sulfur scavenger; and the second pressure vessel may include a palladium catalyst or other material which operates to reduce the dioxygen ($O_2$) concentration by lowering the activation energy required to facilitate combustion between oxygen and the heated gas stream being processed by the recovery system 20, effectively eliminating the limiting reagent as the heated gas stream passes through the second pressure vessel that contains the palladium catalyst at or above a given temperature and pressure. In one example, oxygen is the limiting reagent and the threshold pressure and temperature vary with the composition of the gas stream. In one example, the second pressure vessel reactor is positioned vertically or substantially vertically, so that the natural gas stream flows downwardly through the reactor vessel which essentially packs in the catalytic pebbles and thus reduces the possibility of any channeling of the gas stream. This also ensures contact between the processed natural gas stream and the materials contained in the reactor, respectively resulting in the most efficient reduction of oxygen content.

In one example, a bed of zinc oxide is provided in the first reactor 22A which acts as a sulfur scavenger and protects the palladium catalysts that are in the second reactor from the poisoning effects of sulfur. In one example, it is desirable that the palladium catalyst in the second reactor be exposed inside the second reactor to less than 0.1 parts per million of sulfur; however, there is the possibility of significant concentrations of sulfur, upwards of 300,000 parts per million in one example, that may be present in the vent gas 44 in specific situations, environments or geographical locations.

In place of zinc oxide in the first reactor, other materials or solutions may be used to remove sulfur from the gas stream, including amine solutions of monoethanolamine (MEA) and diethanolamine (DEA). It is also possible to use solid desiccants like iron sponges or polymeric membranes.

As the processed heated gas stream passes through the zinc oxide scavenger bed in the first reactor 22A, sulfur atoms are exchanged with the oxygen atoms in the zinc oxide and removed from the gas stream, as shown in the example reaction:

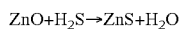

$$ZnO+H_2S \rightarrow ZnS+H_2O$$

Acting as a sacrificial bed, the zinc oxide bed in the first reactor may be replaced periodically.

In place of the palladium catalyst in the second reactor 22B, other materials (i.e., noble metals) may be used, including platinum or palladium/platinum blends. In another example, materials comprising metals such as nickel, cobalt, copper, iron, silver, and gold can be used to cause the oxygen present in the gas stream to react with the metals and reduce the oxygen content in the gas stream.

The second reactor 22B uses a palladium catalyst to facilitate the combustion of the oxygen with hydrocarbons in the processed stream of natural gas while in the second reactor. The oxygen in this case is the limiting reagent and is thus burned up once the light-off temperature is achieved within the second reactor when the gas is at sufficient temperature and pressure, effectively removing or reducing oxygen concentrations present in the gas stream.

The catalytic reaction inside of the second reactor 22B eliminating the oxygen is an exothermic reaction. In order to control the temperature rise that occurs within the second reactor itself, temperature sensors (i.e., thermocouples or RTD's) may be used at the inlet and the outlet of the second reactor to measure the temperature of the processed gas within the second reactor. If the temperature within the second reactor 22B goes above a setpoint (i.e., 700° Fahrenheit), in one example the system 20 may be shut down until the second reactor 22B temperature cools down to an acceptable temperature, at which time the system 20 can be re-started (i.e., 600 Fahrenheit).

Having passed through the first and second reactors 22A-B at the required pressure and temperature, the natural gas stream has substantially less sulfur and oxygen $O_2$ content than it had it prior to entry into the oxygen reduction system.

Referring back to FIG. 4, along Line P13, a trace oxygen analyzer can be used as an oxygen sensor 68 that is coupled with the output of the second reactor of the oxygen reduction system, about Line P13 as shown in FIG. 4. In one example, a pressure reducing regulator valve can be used to reduce the pressure of the gas (i.e., from 400 psig to 100 psig by a Fisher 95H-1724 pressure regulator in one example). A second pressure reducing regulator valve can be used in series to further reduce pressure (i.e., from 100 psig to 20 psig by a Fisher 67CF-1664 pressure regulator in one example), and equipped with a filter and an automatic drain for any liquids that might collect. After passing through both pressure reducing regulator valves the pressure is reduced to acceptable levels, liquids are drained, and contaminants are filtered out of the gas stream so that it can be accepted by the analyzer.

If the gas stream 30 is directed to the sales lines 24, it will enter Line 13 and continue traveling through the check valve out of the recovery system into a normally open ball valve to be metered where it will then enter into the sales line and be sold, such as to a midstream gas gathering company in one example.

If, however, one or more of the conditions for recirculation are present, then the system directs the gas stream such that gas will not enter the sales line 24 and will instead be recirculated internally in the system 20 so it will not leave the system boundary. As part of recirculation, in one embodiment the gas stream at Line P13 is directed into Section 4 of the cooler to further cool down the gas stream in order to protect equipment from excessive temperatures (i.e. recirculation valves, compressor valves, etc.) and also to make sure that the gas that reenters at the first stage suction scrubber vessel of the recovery system 20 through that recirculation loop is cool enough (i.e., equal to or less than 100 degrees Fahrenheit, in one example).

The cooled gas stream for recirculation exits Section 4 of the cooler and is shown as Line P14 where pressure is detected that corresponds to the pressure in the reactors. The recirculated gas is directed into the first stage scrubber through a recirculation valve 70. In one example, the recirculation valve is implemented using two electro-mechanical valves connected in parallel (FIG. 4) that the gas stream travels through for recirculation before the gas stream gets to the first stage inlet scrubber. One of the valves is used to unload the compressor and let it pump gas with very little restriction and pressure rise. It is a "full port," unrestricted valve meaning that its port size is no smaller than the valve body's inlet or outlet. In operation, it is either fully open or fully closed and is under the control of the controller 60. This valve can be used primarily during engine restart of the system, and in one example this valve remains closed during normal recirculation operations and also remains closed when the gas stream is being directed to the sales pipeline 24.

The second valve, in parallel with the first valve, is used to regulate flow and the resultant pressure downstream in the first stage scrubber vessel while the compressor is operating. This precise regulation is made possible with variable valve lift, controlled by the controller's 60 closed control loop with pressure in the first stage scrubber vessel being the process variable (PV) with a given set point (i.e., 0.25 psig vacuum) and the electrical signal to the Current-Pressure converter 80 as the scaled control variable.

In one example, a signal from the pressure sensor transmitter located on the first stage scrubber 76 is received by the controller 60 as an electrical analog signal with varying magnitudes, in one example 4 to 20 milliamps (mA). The controller takes that pressure signal and determines through, in one example, a three-parameter (i.e., proportional, integral, and derivative) closed control loop, the correct output signal to transmit to the second valve to maintain the a desired set point pressure at that first stage inlet scrubber. In one example, the set point pressure is determined by an operator or administrator of the recovery system. In one example that accounts for the pressure drop across the inlet check valve 54, the set pressure during recirculation can be slightly at a vacuum, such as −0.25 psi.

In one example, the controller's output signal is coupled with a Current-Pressure converter 80 (FIG. 2) also known as an IP converter that takes an electrical signal in the form of current (i.e., 4-20 mA) and transfers that into a pressure signal that varies linearly with the electrical signal. The pressure output of converter 80 is coupled with the control line of the second valve to control the valve's lift off of its valve seat on the same valve, which effectively control the flow rate of gas through that valve (shown as FCV-P2 in FIG. 4).

In FIG. 4, an example is illustrated of the engine-specific portion of an electrical power system that may be employed in a recovery system 20, in accordance with one embodiment of the present invention. In one example, two or more batteries may be connected in series, including a 12 volt battery and another 12 volt battery, and therefore the series combination provides a 24 volt potential. Energy from a generator 60 (which may be implemented using an alternator) can be coupled with the batteries to provide re-charging during operations of the engine. FIG. 4 also illustrates both power to the ignition as well as power to the engine starter is controlled through respective electrical relays. An output that controls Engine Speed, as well as the Engine Speed sensor (shown as ST-E1), are shown.

Referring back to FIG. 3, FIG. 3 illustrates one example of a controller 60 that can be used in a recovery system 20, in accordance with one embodiment of the present invention. In one example, the controller 60 is a programmable logic controller (PLC), such as a Direct Logic 06 PLC, although any capable controller, processor or logic can be used. As shown in FIG. 3, the controller 60 may be configured to receive a plurality of inputs, either directly or through interface circuitry, and the inputs may include but are not limited to: engine speed input, which may be derived from a magnetic pickup sensor on the engine flywheel to monitor engine speed; engine oil pressure; engine coolant temperature; engine oil level; engine oil temperature; engine coolant level; position(s) of emergency shutdown button(s); stage 1 inlet scrubber high liquid level, which indicates that the level of scrubbed liquids inside the respective scrubber vessel is outside (i.e., too high) of acceptable operating conditions; stage 2 inlet scrubber high liquid level, which indicates that the level of scrubbed liquids inside the respective scrubber vessel is outside (i.e., too high) of acceptable operating conditions; stage 3 inlet scrubber high liquid level, which indicates that the level of scrubbed liquids inside the respective scrubber vessel is outside (i.e., too high) of acceptable operating conditions; stage 1 inlet scrubber pressure, which can indicate a potential issue with the recirculation valve 70 or flow rate through the recirculation line; stage 2 inlet scrubber pressure, which can indicate a problem with discharge valve(s) in the $1^{st}$ stage of compression if the measured pressure is too low, or a problem with the suction valve(s) in the $2^{nd}$ stage of compression if the measured pressure is too high; stage 3 inlet scrubber pressure, which can indicate a problem with discharge valve(s) in the $2^{nd}$ stage of compression if the measured pressure is too low, or a problem with the suction valve(s) in the $3^{rd}$ stage of compression if the measured pressure is too high; oxygen reduction reactor gas discharge pressure (outlet pressure sensor 74, described above), and if too high, may need to shutdown system; oil tank pressure sensor (pressure sensor 53, described above) if this value is extremely low, then it may mean that the oil tank thief hatch valves 27 may be left open, wherein the system 20 can generate a notification (i.e., email and/or text message or other conventional communications techniques) to be sent to persons or companies (such as a representative of the production company) informing them that the hatch 27 is likely open; compressor vibration sensor, which can be used to detect a mechanical problem that could cause the compressor to vibrate; engine vibration sensor, which can be used to detect a mechanical problem that could cause the engine to vibrate; cooler fan vibration sensor, which can be used to detect a mechanical problem that could cause the cooler fan to vibrate; compressor oil level, which can be used to detect the height of standing oil in the compressor crank case; compressor oil temperature, which can be used to detect if the lubrication oil used by the compressor is hotter than allowable operating limitations (i.e., 220 degrees Fahrenheit); compressor oil distribution block no-flow indicator, which can be used to detect if there is no flow of lubrication oil to various parts of the compressor (i.e., cylinder(s), packing(s), etc.); compressor oil pressure, which can be used to detect if the pressure of the lubrication oil used by the compressor is below allowable operating limitations (i.e., below 25 psig); compressor gas discharge pressure sensor 74, which can be used to detect if the pressure of the gas at the outlet of the last stage of compression is outside of allowable operating limitations (i.e., 400 psig or the maximum that is allowed by the vessel and or pipeline connected to the discharge of the recovery system 20); combustible vapor sensor (LEL), which can be used to detect the presence of an explosive mixture of gas which could result from a leak in the plumbing near or present at the recovery system; first stage compressor discharge temperature, which can be used to detect if the temperature of the gas at the discharge of the first stage of compression is too hot when compared allowable operating conditions (i.e., 192 degrees Fahrenheit or more), which could indicate a valve failure and possibly lead to equipment damage; second stage compressor discharge temperature, which can be used to detect if the temperature of the gas at the discharge of the second stage of compression is too hot when compared allowable operating conditions (i.e., 307 degrees Fahrenheit or more), which could indicate a valve failure and possibly lead to equipment damage; third stage compressor discharge temperature, which can be used to detect if the temperature of the gas at the discharge of the third stage of compression is too hot when compared allowable operating conditions (i.e., 330 degrees Fahrenheit or more), which could indicate a valve failure and possibly lead to equipment damage; oxygen reduction reactor inlet temperature, which can be used to indicate if the gas entering the oxygen reduction reactor is hotter than allowable operating conditions (i.e., over 600 degrees Fahrenheit) as well as indicate that the temperature of the gas coming into the reactors was high enough to allow the catalytic oxygen removal reaction to take place; oxygen reduction reactor exhaust temperature, which can be used to indicate if the gas exiting the oxygen reduction reactor is hotter than allowable operating conditions (i.e., over 600 degrees Fahrenheit), which could possibly be due to higher-than-desired oxygen levels present in the stream; engine exhaust temperature pre catalytic converter, which can be used to indicate if the gas entering the engine exhaust catalytic converter is hotter than allowable operating conditions (i.e., over 1,300 degrees Fahrenheit); engine exhaust temperature post catalytic converter, which can be used to indicate if the gas exiting the engine exhaust catalytic converter is hotter than allowable operating conditions (i.e., over 1,400 degrees Fahrenheit), which could possibly be due to one or more engine cylinders improperly firing which could send unburned fuel to the catalytic converter where it would be combusted, resulting in a temperature rise across the catalytic converter; oxygen sensor 52 at the inlet, described above; oxygen sensor 68 at the output, describe above.

The controller 60 may also be configured to provide one or more outputs, either directly or through conventional interface circuitry, such as but not limited to: a control signal for controlling inlet valve 56, described above; a control signal for a compressor unloader valve, which may have a delay 2 minutes or longer, so that the engine idles for that delay period until the engine coolant reaches acceptable operating temperatures (i.e., above 140 degrees Fahrenheit) before increasing rotational speed as the compressor is loaded; engine fuel solenoid control signal for opening a valve to provide fuel to the engine; inlet oxygen sensor pump, which activates inlet oxygen sensor pump 52; electronics cabinet heater control, which can be used to maintain a desired temperature range (i.e., between 60 and 80 degrees Fahrenheit), protecting any temperature-sensitive devices inside the electronics cabinet(s); recirculation valve control of valve(s) 70, described above; engine ignition control signal; engine start control signal for energizing a starter relay for the engine starter; engine speed control, which can be used to govern engine rotation speed to a desired setpoint (i.e., 900 to 1800 revolutions per minute); pre-start oil lubrication oil pump, which can be used to provide sufficient oil pressure to float the compressor crank shaft on its bearings prior to startup.

The controller 60 may also be provided with a display and a keyboard, or with a touch screen, in order to provide status information regarding the system, and/or to provide controls for an operator.

The controller 60 may implement one or more functions or operations as described herein. In one example, the controller 60 implements one or more of the following operations or sequence of operations:

POWER ON to PLC, Touchscreen, End Devices, etc.
Upload:
    PLC Program version to display on touchscreen
Setup and Scale Analog Input Channels:
    Storage Tank Pressure Transmitter: 0-57.8 oz/in$^2$
    Stage 1 Scrubber Pressure Transmitter: 0-44.7 psia
    Stage 2 Scrubber Pressure Transmitter: 0-100 psig
    Stage 3 Scrubber Pressure Transmitter: 0-200 psig
    Reactor Discharge Pressure Transmitter: 0-500 psig
    Compressor Lube Oil Pressure Transmitter: 0-100 psig
    Engine Lube Oil Pressure Transmitter: 0-100 psig
    Oxygen Reactor Inlet Temperature Transmitter: 0-1000 deg F.
    Oxygen Reactor Outlet Temperature Transmitter: 0-1000 deg F.
    Engine Coolant Temperature Transmitter: 0-300 deg F.
    Engine Exhaust Gas Pre-Catalytic Converter Temperature Transmitter: 0-2000 deg F.
    Engine Exhaust Gas Post-Catalytic Converter Temperature Transmitter: 0-2000 deg F.
    Oxygen Analyzer 1: Concentration at Inlet Valve: 0-25%
    Oxygen Analyzer 2: Concentration at Reactor Discharge Valve: 0-25%
    Stage 1 Compression Discharge Temperature Transmitter: 0-300 deg F.
    Stage 2 Compression Discharge Temperature Transmitter: 0-1000 deg F.
    Stage 3 Compression Discharge Temperature Transmitter: 0-1000 deg F.
    Recirculation Gas Stream Temperature Transmitter: 0-300 deg F.
Setup and Scale Analog Output Channel:
    Recirculation Control Valve Bonnet Pressure: 0-30 psig
List of Discrete Inputs:
    Magnetic Proximity Sensor: Engine Flywheel Gear Tooth counter
    Stage 1 Inlet Scrubber High Liquid Level Switch
    Stage 2 Inlet Scrubber High Liquid Level Switch
    Stage 3 Inlet Scrubber High Liquid Level Switch
    Engine Coolant Low Liquid Level Switch
    Compressor Crankcase Lube Oil Low Liquid Level Switch
    Engine Crankcase Lube Oil Low Liquid Level Switch
    Vibration Detector: Compressor
    Vibration Detector: Engine
    Vibration Detector: Cooler
    Compressor Lube Oil High Temperature Switch: >190 deg F.
    Engine Lube Oil High Temperature Switch: >220 deg F.
    Compressor Discharge High Pressure Switch: >390 deg F.
    Electrical Cabinet Low Temperature Thermostatic Switch
    Compressor Lube Oil Distribution Block No-Flow Indicator Switch
    Emergency Shut Down Pushbutton (referred to as ESD PB throughout)
List of Discrete Outputs:
    Inlet Motor Valve: OPEN/CLOSE
    Compressor Motor Valve: OPEN/CLOSE
    Engine Fuel Valve: OPEN/CLOSE
    Engine Starter Power: Relay ON/OFF
    Engine Ignition Power: Relay ON/OFF
    Diaphragm Pump Supply to Oxygen Analyzer 1: ON/OFF
    Compressor Crankshaft Pre-start Lube Pump Valve: OPEN/CLOSE
    Electrical Cabinet Enclosure Heaters: ON/OFF
    Engine Rotational Speed Control: 900/1800 RPM
Set all Negative Analog Input Values to Zero
Set up Fast Counter for Engine Flywheel Magnetic Pickup—determine Engine speed in RPM
    Counts Gear teeth passing by per second
    Divides by number of gear teeth on engine flywheel (SAE #3: 127 teeth)
    Multiply by (60 sec/min) to get Revolutions per Minute
List of Shut Downs:
    Engine Lube Oil Low Pressure: <15 psig
    Engine Coolant High Temperature: >212 deg Fahrenheit
    Stage 1 Scrubber High Pressure: >17.2 psia (at 5000 ft elevation)
    Stage 1 Scrubber Low Pressure: >7.7 psia
    Stage 2 Scrubber High Pressure: >46.7 psia
    Stage 2 Scrubber Low Pressure: >26.4 psia
    Stage 3 Scrubber High Pressure: >171.6 psia
    Stage 3 Scrubber Low Pressure: >91.1 psia
    Reactor Discharge High Pressure: >400 psig
    Compressor Lube Oil Low Pressure: >25 psig
    Engine Lube Oil Low Pressure: >25 psig
    Oxygen Reactor Inlet High Temperature: >600 deg F.
    Oxygen Reactor Outlet HighTemperature: >700 deg F.
    Engine Coolant Temperature Transmitter: 0-300 deg F.
    Engine Exhaust Gas Pre-Catalytic Converter High Temperature: >1300 deg F.
    Engine Exhaust Gas Post-Catalytic Converter High Temperature: >1400 deg F.
    Engine Exhaust Gas High Temperature Differential: >200 deg F.
    Oxygen Analyzer 1: Concentration at Inlet Valve: >10%
    Oxygen Analyzer 2: Concentration at Reactor Discharge Valve: >10 ppm for 24 hours Stage 1 Compression Discharge High Temperature: >192 deg F.
Stage 2 Compression Discharge High Temperature: >307 deg F.
Stage 3 Compression Discharge High Temperature: >330 deg F.
Recirculation Gas Stream High Temperature: >125 deg F.
Stage 1 Inlet Scrubber High Liquid Level
Stage 2 Inlet Scrubber High Liquid Level
Stage 3 Inlet Scrubber High Liquid Level
Engine Coolant Low Liquid Level
Compressor Crankcase Lube Oil Low Liquid Level
Engine Crankcase Lube Oil Low Liquid Level
Vibration Detector: Compressor
Vibration Detector: Engine
Vibration Detector: Cooler
Compressor Lube Oil High Temperature: >190 deg F.
Engine Lube Oil High Temperature: >220 deg F.
Compressor Discharge High Pressure: >390 deg F.
Compressor Lube Oil Distribution Block No-Flow Indicator Switch
Emergency Shut Down Pushbutton Pushed In
Engine Failed to Start
Engine Over Speed
Engine is authorized to start and run if no Shutdowns are Present
Engine Starter is turned for 8 seconds then rests for 20 seconds if the following conditions are ALL true:
Engine is authorized to run
Engine speed is below 350 RPM
The starter crank sequence has not occurred 8 times without successful engine start
This results in a Failed to Start Shutdown
Engine Ignition Relay is tuned on if the following conditions are ALL true:
Engine is authorized to run
Engine speed is above 10 RPM
Engine Fuel Valve OPENS:
2 seconds after Engine Ignition turns on
Engine at idle speed (900 RPM) until two minutes after Engine starts and Engine coolant temperature is above 140 deg Fahrenheit
Compressor Unloader Valve OPENS if either of the following are true:
When Engine Stops
Stays open until 10 seconds after Engine reaches Full Speed
Diaphragm Pump Supply to Oxygen Analyzer 1 Powered ON if:
Diaphragm Pump Supply to Oxygen Analyzer 1 Not Deactivated on Touchscreen, AND
No Shut Downs are present, AND
Engine is running
Compressor Crank Shaft PreLubrication Pump Valve OPEN if any of the following are true:
Engine is starting
Stays open until 10 minutes after engine has successfully started
Inlet Motor Valve OPEN if:
One or Other of the following is true:
Oxygen Concentration @ Inlet Motor Valve is below 3%, OR
Oxygen Concentration @ Inlet Motor Valve is below 10% for 5 seconds every minute to throttle oxygen-rich vapor through the system without creating excessive temperatures in the reactors
AND all of the following are true
Oxygen Concentration @ Inlet Motor Valve is below 10%
The Engine is Authorized to Run (discussed below)
Tank Pressure is above 0.25 oz/sqin
Unloader Valve is CLOSED
Oxygen Concentration @ Reactor Discharge is below 10 ppm
Inlet Valve Opening is Not Deactivated by Operator @ Touchscreen
Final stage discharge & reactor pressures not within 20 psi of high pressure shutdown setpoint
ESD PB NOT PUSHED IN
Recirculation Valve Opening Control: Closed Control Loop
Setup so that PID Closed Control Loop Adjusts Recirculation Valve Position to maintain Stage 1 Inlet Scrubber Vessel Pressure at desired setpoint:
Process Variable: Stage 1 Scrubber Vessel Pressure
Setpoint: 12.2 psia
Control Output: Reverse Acting Signal to Current-Pressure Converter that controls Recirculation Valve Lift
Tune Control Loop using
Proportional Gain
Integral Gain/Reset
Derivative Gain/Rate only to be used when necessary It is understood that a controller 60 for a recovery system 20 could be implemented using one or more of these operations, or combinations thereof, in accordance with other embodiments of the present invention.

Figure 5:
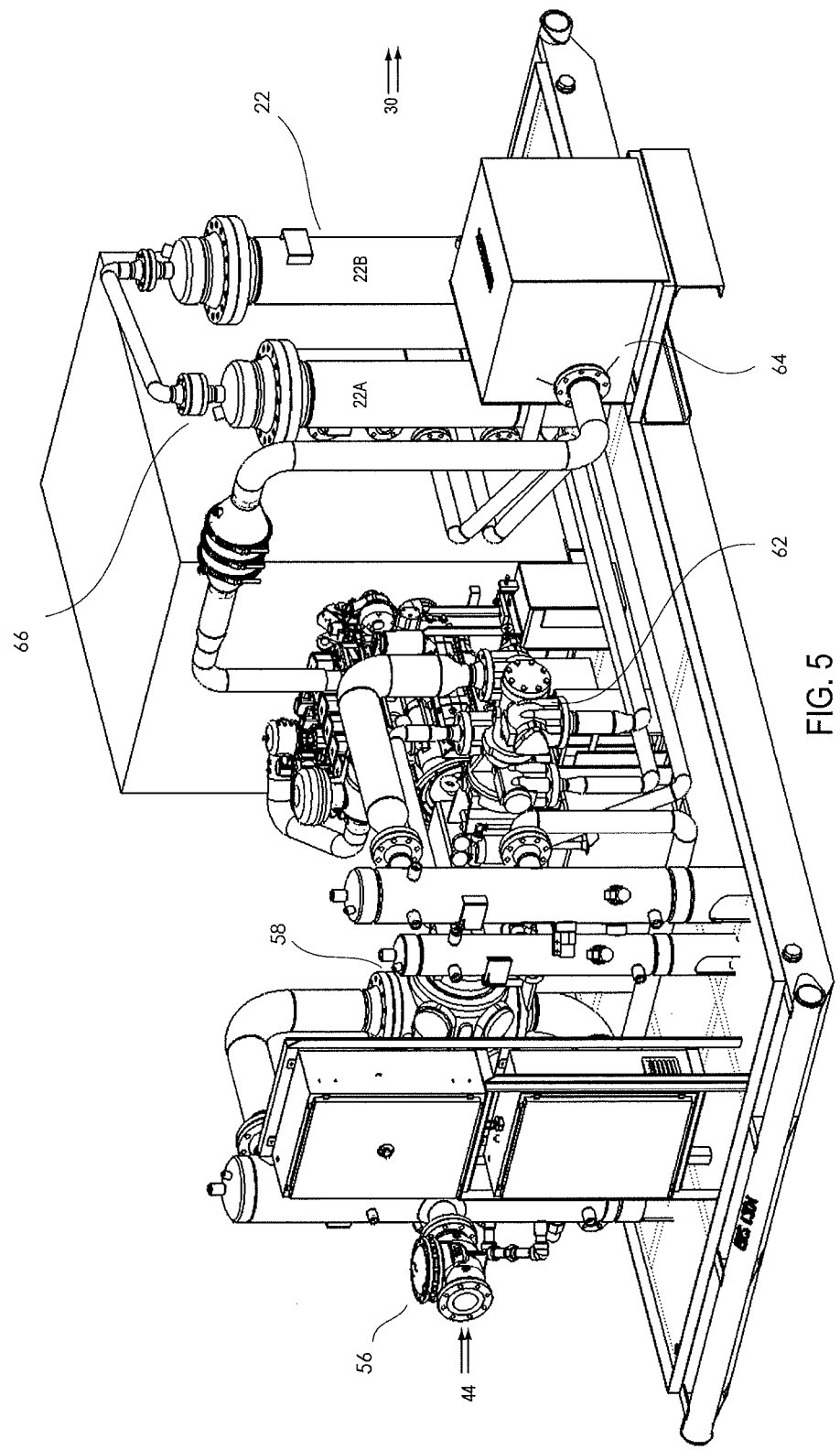
FIG. 5 illustrates an isometric view of an example of one embodiment of the present invention.

FIG. 5 provides an isometric view of one embodiment of the present invention, showing various components as described herein. It is understood that other embodiments could be formed wherein the components are positioned in different locations than as shown in FIG. 5.

Figure 6:
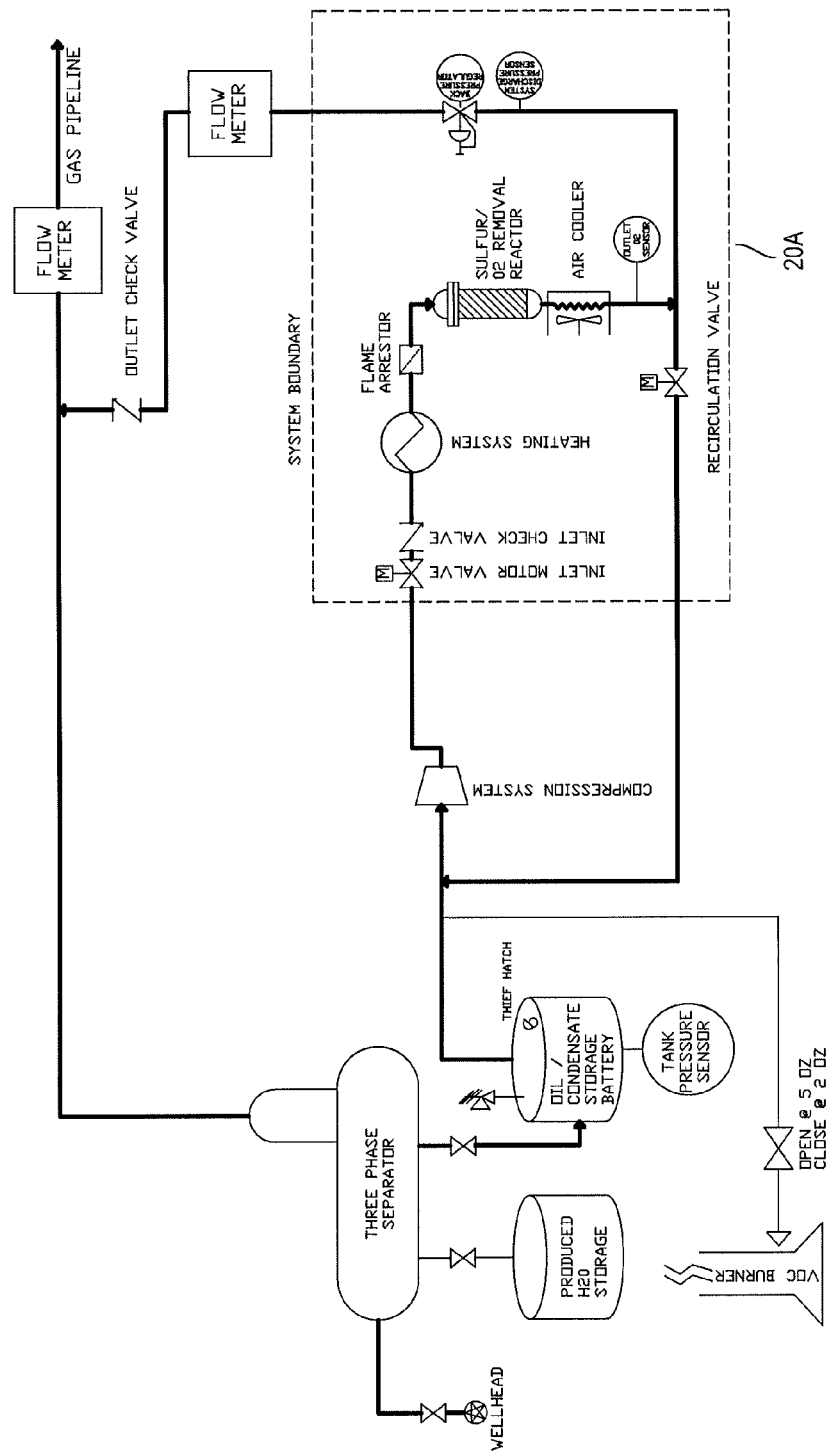
FIG. 6 illustrates an example of an alternative embodiment of the present invention, including system 20A.

FIGS. 6-12 illustrate various alternative embodiments of system 20. In the example of FIG. 6, the system 20A is downstream of a separate compressor system. In this embodiment, system 20A has a heating system to get the process gas stream up to a temperature which would allow the reaction in the catalyst to take place. The gas would then flow through the reactor, where the diametric oxygen is removed from the gas. The recovered gas passes through a system flow meter into the gas pipeline. If the recovered gas doesn't meet the specifications needed to go into the gas pipeline, the recovered gas can go through a recirculation valve and enter system 20A once again upstream of the compression system.

Figure 7:
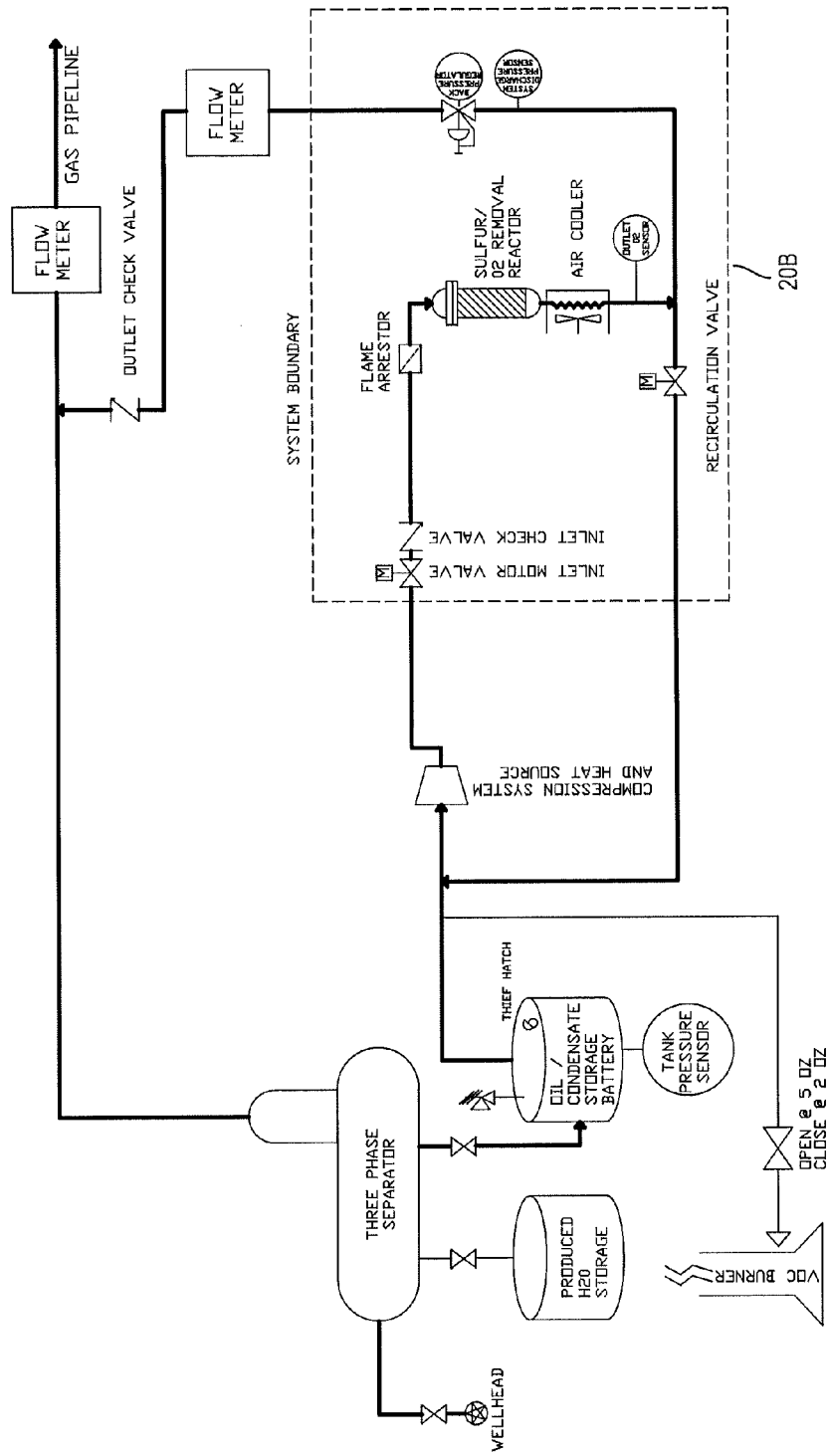
FIG. 7 illustrates another example of an alternative embodiment of the present invention, including system 20B.

In the example of FIG. 7, the system 20B is downstream of a compressor system that also includes a heat source, either through compression or with a heater added to it. The recovered gas would then flow through the reactor, where the diametric oxygen is removed from the system. Then the recovered gas would go through a system flow meter and into the gas pipeline. If the recovered gas doesn't meet the specifications needed to go into the gas pipeline, the recovered gas would go through a recirculation valve and enter system 20B once again into an input to the compression system.

Figure 8:
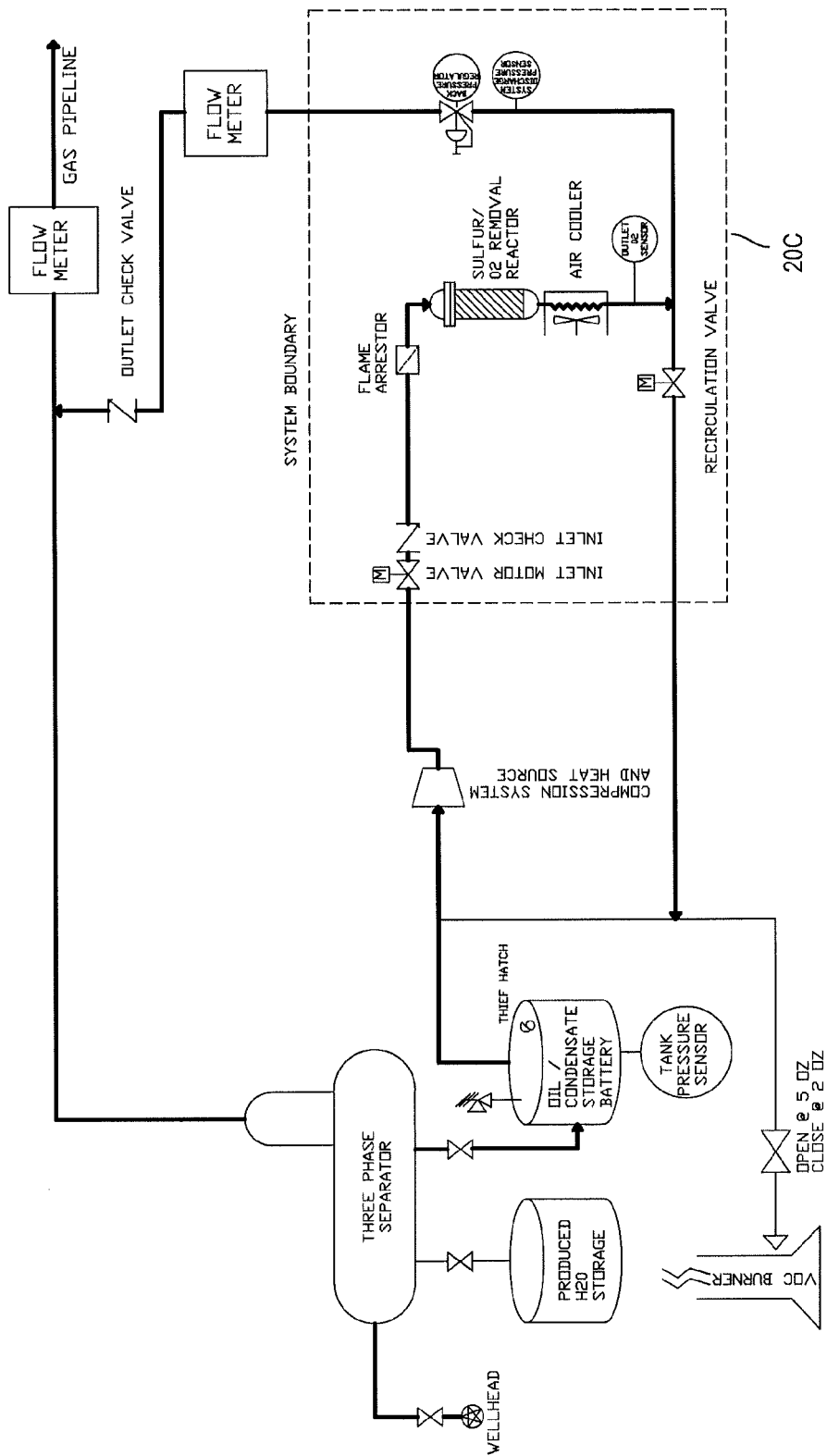
FIG. 8 illustrates another example of an alternative embodiment of the present invention, including system 20C.

In the example of FIG. 8, system 20C is downstream of a compressor system that includes a heat source, either through compression or with a heater added to it, similar to FIG. 7. In contrast with FIG. 7, in the example of FIG. 8, if the recovered gas doesn't meet the specifications needed to go into the gas pipeline, the recovered gas would go through a recirculation valve and flow directly to a VOC burner/flare 28.

Figure 9:
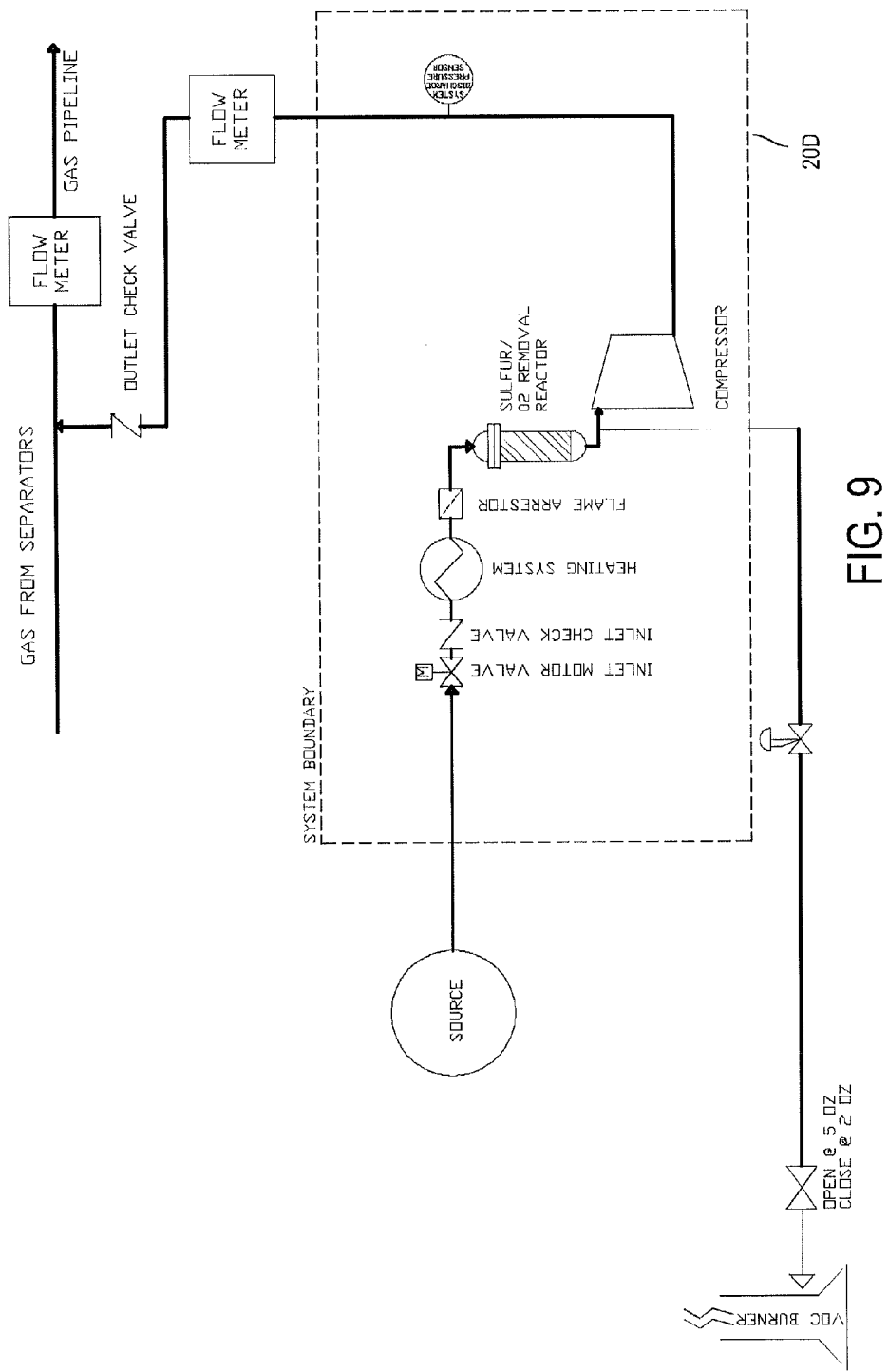
FIG. 9 illustrates another example of an alternative embodiment of the present invention, including system 20D.

In the example of FIG. 9, the system 20D is downstream of a gas source. In this embodiment, system 20D has a heating system to get the recovered gas stream up to a temperature which would allow the reaction in the catalyst to take place. The recovered gas would then flow through the reactor, where the diametric oxygen is removed from the recovered gas. If the recovered gas meets the specifications needed to go into the gas pipeline, the recovered gas is then compressed, and follows the path to the pipeline. If the recovered gas does not meet the specifications needed to go into the pipeline, the gas then goes to a VOC burner/flare.

Figure 10:
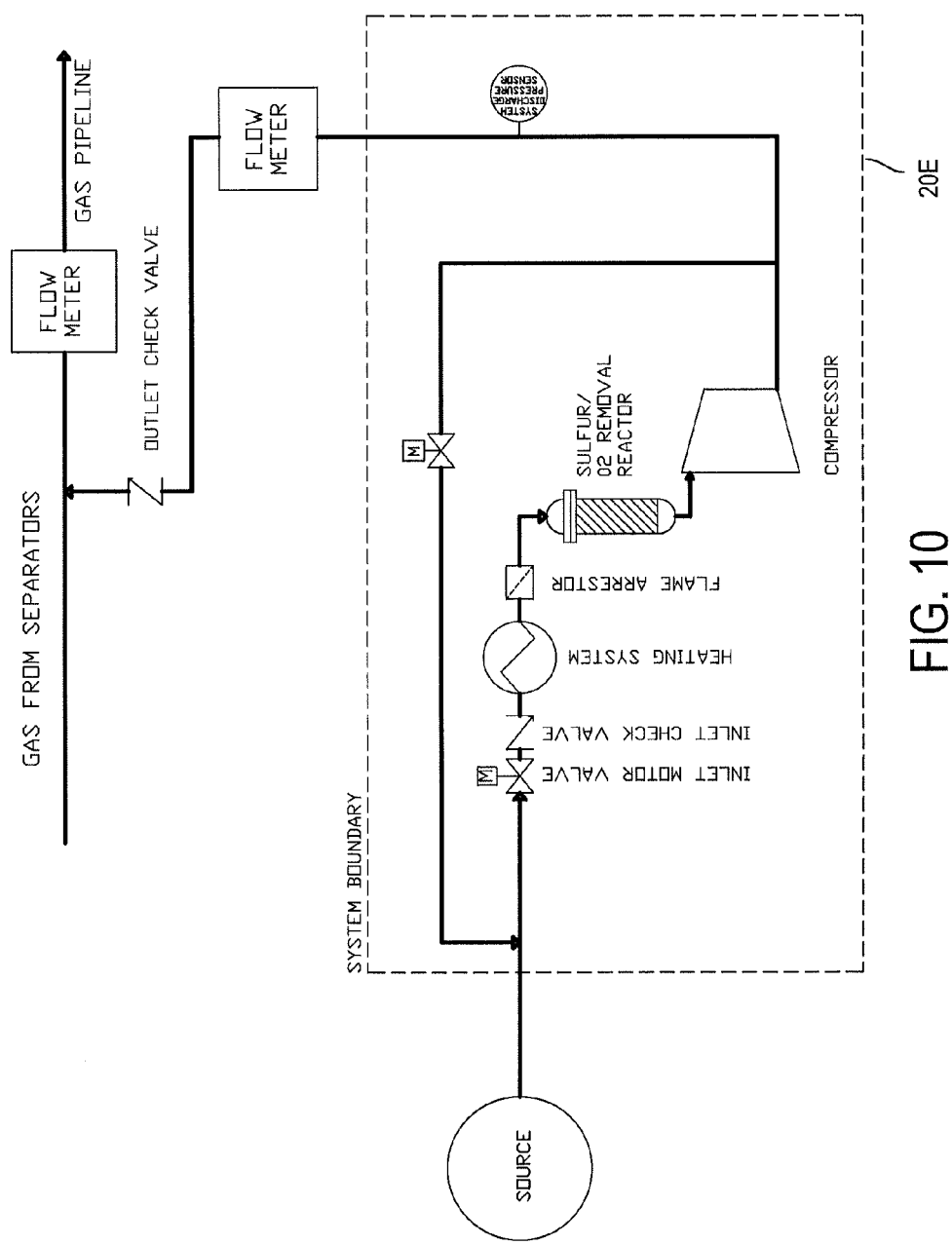
FIG. 10 illustrates another example of an alternative embodiment of the present invention, including system 20E.

In the example of FIG. 10, system 20E is downstream of a gas source. In this embodiment, a heating system heats the recovered gas stream up to a temperature which would allow the reaction in the catalyst to take place. The recovered gas would then flow through the reactor, where the diametric oxygen is removed from the recovered gas. After exiting the reactor, the recovered gas then goes into the compressor system. If the recovered gas meets the specifications needed to go into the gas pipeline, the gas then follows the path to the pipeline. If the recovered gas does not meet the specifications needed to go into the pipeline, then in contrast with FIG. 9, in the example of FIG. 10 the recovered gas then goes through a recirculation valve which brings it to the front end of system 20E.

Figure 11:
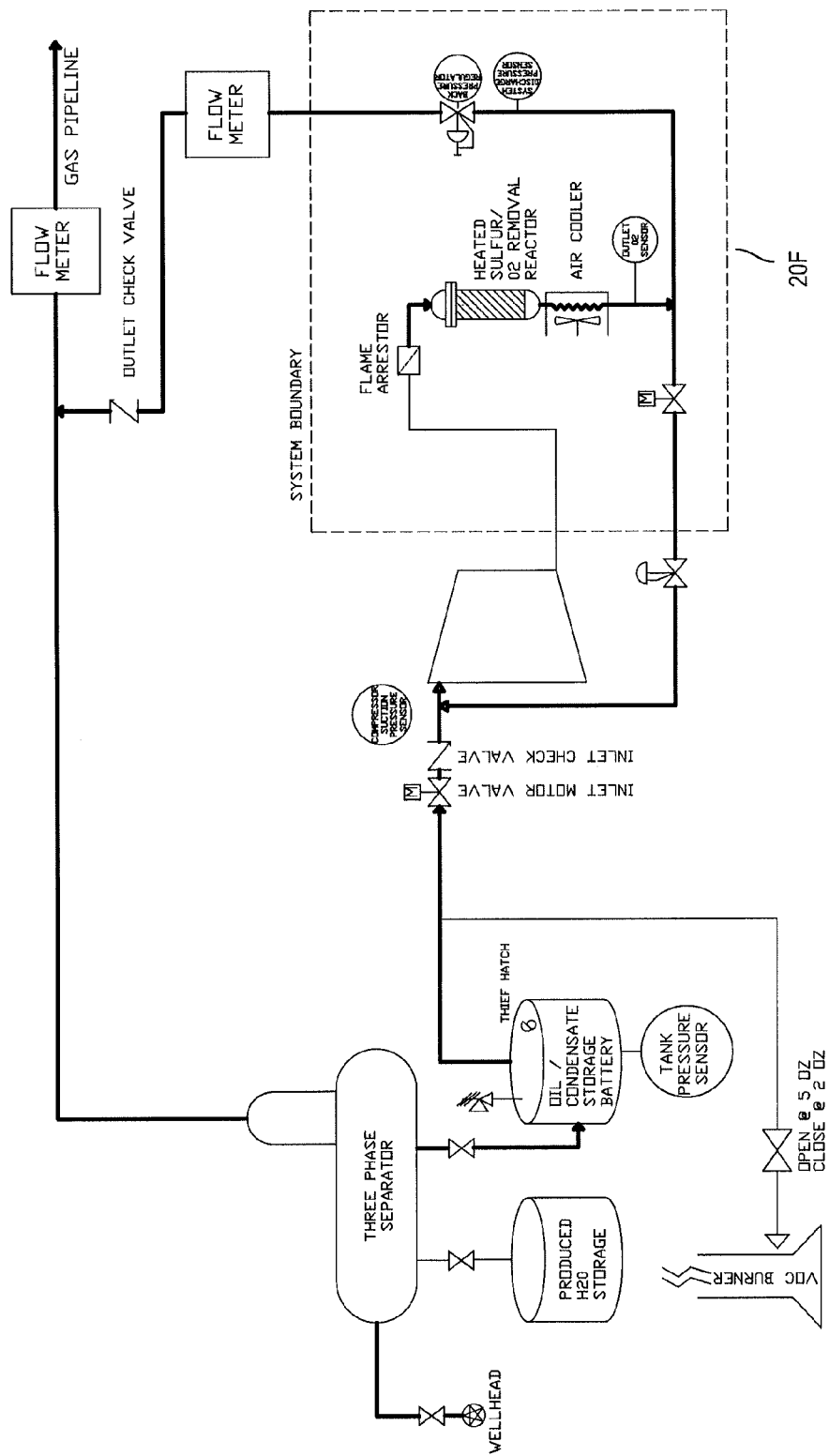
FIG. 11 illustrates another example of an alternative embodiment of the present invention, including system 20F.

In the example of FIG. 11, system 20F receives vapors from a gas source that has been compressed by a compressor. The gas would then flow through the reactor, where the diametric oxygen is removed from the recovered gas. The reactor is heated, which allows the reaction between the gas and the catalyst to take place. If the recovered gas meets the specifications needed to go into the gas pipeline, the gas is then compressed, and follows the path to the pipeline. If the gas does not meet the specifications needed to go into the pipeline, the gas then goes through a recirculation valve which brings it to the front end of the compressor.

Figure 12:
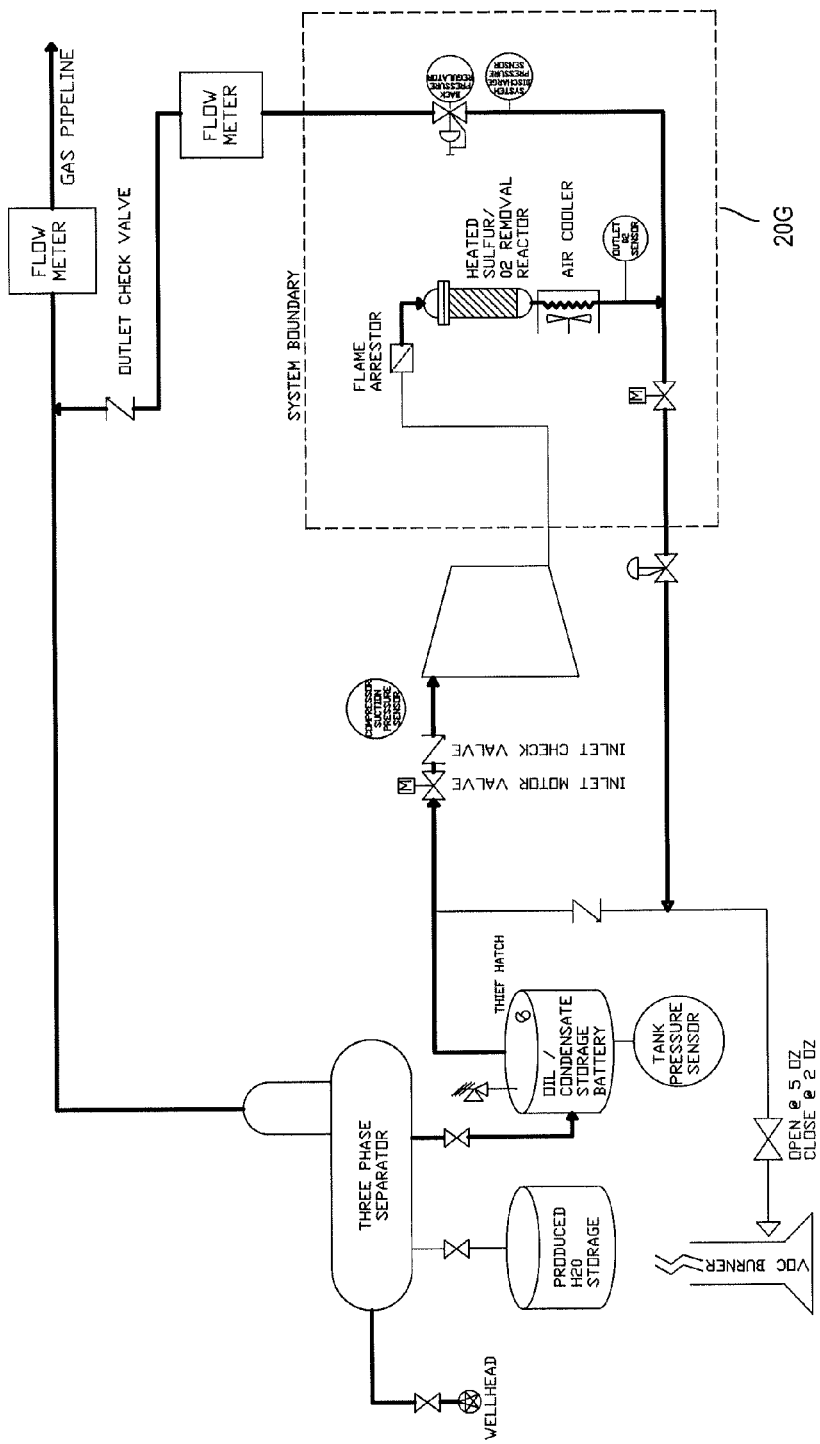
FIG. 12 illustrates another example of an alternative embodiment of the present invention, including system 20G.

In the example of FIG. 12, system 20G is similar to system 20F of FIG. 11, except that if the recovered gas from system 20G does not meet the specifications needed to go into the pipeline, the recovered gas then goes directly to a VOC burner/flare.

Hence, it can be seen that various embodiments of systems and processes are provided herein for recovering natural gas and reducing oxygen content in the recovered natural gas, without the use of a bag or flexible storage tank on the front end of such recovery system. Use of embodiments of the present invention has resulted in the output of the recovery system 20 providing recovered natural gas with undetectable trace levels oxygen.

While embodiments of the invention have been described with reference to natural gas gathering pipeline systems, it will be understood that one or more features of embodiments of the present invention can be used to reduce the oxygen content of natural gas streams, recovered natural gas streams, oil condensate storage tank vapors, or other gas streams.

The output of embodiments of the invention can be used to provide natural gas and natural gas liquids, and can be used as an energy source, as a purified fuel source for on-site or off-site equipment, as fuel for refrigeration processes or other processes, as fuel in other uses where corrosion due to oxidation is a concern, or as fuel for other systems or environments where natural gas or natural gas liquids are used.

It is understood that the specific dimensions, values, and thresholds disclosed herein are provided as examples, and that embodiments of the present invention may be formed using other sizes or dimensions of the components without departing from the teachings herein.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations are not a limitation of the present invention.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. Inventive aspects lie in less than all features of a single foregoing disclosed embodiment, and each embodiment described herein may contain more than one inventive feature.

While the invention has been particularly shown and described with reference to embodiments thereof, it will be understood by those skilled in the art that various other changes in the form and details may be made without departing from the spirit and scope of the invention.

We claim:

1. A system for reducing dioxygen ($O_2$) present in vapors from oil storage tanks, comprising:
    an inlet that receives the vapors from at least one oil storage tank;
    a heating device coupled with the inlet, the heating device heating the vapors to a first temperature to form heated vapor; and
    at least one vessel coupled with the heating device, the vessel receiving the heated vapor, the vessel containing at least one catalyst to reduce dioxygen from the heated vapor when the heated vapor passes through the vessel.

2. The system of claim 1, wherein the catalyst includes a material selected from the group consisting of palladium, platinum, copper, nickel or combinations thereof.

3. The system of claim 1, wherein the vessel includes a material to remove sulfur from the heated vapor.

4. The system of claim 3, wherein the vessel includes a first section and a second section positioned in series, wherein the first section includes the material to remove sulfur and the second section includes the at least one catalyst, such that the heated vapor passes through the first section and second sections in sequence.

5. The system of claim 3, wherein the material includes zinc oxide.

6. The system of claim 1, wherein the at least one vessel includes a pair of vessels with a first vessel and a second vessel positioned in series, wherein the first vessel includes the material to remove sulfur and the second vessel includes the at least one catalyst, such that the heated vapor passes through the first vessel before passing through the second vessel.

7. The system of claim 1, further comprising: a compressor connected between the inlet and the heating system, the compressor receiving the vapors and compressing the vapors.

8. The system of claim 1, further comprising a controller monitoring the $O_2$ concentration in the heated vapor.

9. The system of claim 8, wherein the controller directs the flow of the heated vapor to a gas pipeline if the $O_2$ concentration is below a predetermined level.

10. The system of claim 8, wherein the controller directs the flow of the heated vapor to be re-circulated within the system if the $O_2$ concentration is above a predetermined level.

11. The system of claim 8, wherein if the $O_2$ concentration is above a predetermined level, the controller closes the inlet to prevent flow of said vapors from the at least one oil storage tank.

12. A system for reducing dioxygen ($O_2$) present in vapors from a source of vapor emissions, comprising:
   an inlet that receives the vapors from the source of vapor emissions;
   a compressor connected with the inlet, the compressor receiving the vapors and compressing the vapors;
   a heating device coupled with an output of the compressor, the heating device heating the vapors to a first temperature to form heated vapor; and
   at least one vessel coupled with the heating device, the vessel receiving the heated vapor, the vessel containing at least one catalyst to reduce dioxygen from the heated vapor when the heated vapor passes through the vessel.

13. The system of claim 12, wherein the catalyst includes palladium.

14. The system of claim 12, wherein the vessel includes a material to remove sulfur from the heated vapor.

15. The system of claim 14, wherein the material includes zinc oxide.

16. The system of claim 12, wherein the vessel includes a first section and a second section positioned in series, wherein the first section includes the material to remove sulfur and the second section includes the at least one catalyst, such that the heated vapor passes through the first section and second sections in sequence.

17. The system of claim 12, further comprising a controller monitoring the $O_2$ concentration in the heated vapor.

18. The system of claim 17, wherein the controller directs the flow of the heated vapor to a gas pipeline if the $O_2$ concentration is below a predetermined level.

19. The system of claim 17, wherein the controller directs the flow of the heated vapor to be re-circulated within the system if the $O_2$ concentration is above a predetermined level.

20. The system of claim 17, wherein if the $O_2$ concentration is above a predetermined level, the controller closes the inlet to prevent flow of said vapors from the source of vapor emissions.

* * * * *